US007620558B2

United States Patent
Fujita et al.

(10) Patent No.: US 7,620,558 B2
(45) Date of Patent: Nov. 17, 2009

(54) INFORMATION RECORDED MEDIUM, INFORMATION DISPLAY, INFORMATION PROVIDING DEVICE, AND INFORMATION PROVIDING SYSTEM

(75) Inventors: Takeshi Fujita, Chiba (JP); Hitoshi Endoh, Saitama (JP); Nariaki Hatta, Tokyo (JP); Yasufumi Fujikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 1416 days.

(21) Appl. No.: 10/111,714

(22) PCT Filed: Aug. 23, 2001

(86) PCT No.: PCT/JP01/07228

§ 371 (c)(1),
(2), (4) Date: Aug. 9, 2002

(87) PCT Pub. No.: WO02/19079

PCT Pub. Date: Mar. 7, 2002

(65) Prior Publication Data

US 2003/0040945 A1    Feb. 27, 2003

(30) Foreign Application Priority Data

Aug. 31, 2000    (JP)    ............................ 2000-263894
Aug. 31, 2000    (JP)    ............................ 2000-263895

(51) Int. Cl.
*G06Q 99/00* (2006.01)
(52) U.S. Cl. ........................................................ 705/1
(58) Field of Classification Search ...................... 705/1
See application file for complete search history.

(56) References Cited

U.S. PATENT DOCUMENTS 5,477,446 A     12/1995   Takakura et al.
5,624,119 A *    4/1997   Leake .......................... 273/269
6,061,660 A *    5/2000   Eggleston et al. ............. 705/14

(Continued)

FOREIGN PATENT DOCUMENTS

EP              858220              8/1998

(Continued)

*Primary Examiner*—Jonathan Ouellette
(74) *Attorney, Agent, or Firm*—Finnegan, Henderson, Farabow, Garrett & Dunner, L.L.P.

(57) ABSTRACT

The invention provides a data-recording medium, a data-displaying apparatus, a data-providing apparatus and a data-providing system, each of which is useful in the course of exchanging information with other people through communications means such as telephone lines or dedicated lines, radio waves or optical communication. The medium, data-displaying apparatus, data-providing apparatus and data-providing system may be of the type that is user-friendly in, for example, applying an entry for a prize contest or a lottery or reservation by using a novel icon that makes it easy for the user to access data sources, retrieve data from the sources and file the data.

An application menu is contained in the information related to the primary icon, the secondary icon or any lower-order icon displayed in the second management region (50a). When the application menu is selected, a computer performs a prescribed process, displaying a data sheet in the first management region (12a). When prescribed data is written in the data sheet, thereby making a reservation. Then, the computer has access to a data-providing server (4C) and acquires a result-obtaining icon (103a) selected on the basis of the conditions stored in the data-providing server (4C). The result-obtaining icon is displayed in the second management region (50a).

32 Claims, 14 Drawing Sheets

U.S. PATENT DOCUMENTS

| | | | |
|---|---|---|---|
| 6,368,218 B2 * | 4/2002 | Angell, Jr. | 463/40 |
| 6,761,633 B2 * | 7/2004 | Riendeau et al. | 463/16 |
| 6,773,345 B2 * | 8/2004 | Walker et al. | 463/17 |
| 7,054,830 B1 * | 5/2006 | Eggleston et al. | 705/14 |

FOREIGN PATENT DOCUMENTS

| | | |
|---|---|---|
| EP | 982947 | 3/2000 |
| JP | 6-74877 | 3/1994 |
| JP | 10-207805 | 8/1998 |
| JP | 10-254910 | 9/1998 |
| JP | 10-285593 | 10/1998 |
| JP | 11-250155 | 9/1999 |
| JP | 2000-69442 | 3/2000 |

* cited by examiner

INFORMATION RECORDED MEDIUM, INFORMATION DISPLAY, INFORMATION PROVIDING DEVICE, AND INFORMATION PROVIDING SYSTEM

TECHNICAL FIELD

The present invention relates to a data-recording medium, a data-displaying apparatus, a data-providing apparatus and a data-providing system, each of which is useful in applying an entry for a prize contest or a lottery or reservation by using a novel icon that makes it easy for the user to access data sources, retrieve data from the sources and file the data, in the course of exchanging information with other people through communications means.

BACKGROUND ART

Recently, more and more people use the Internet. The servers that can be accessed to from the terminals connected to the Internet have increased to a great number. Various kinds of information are recorded in each server at the discretion of the manager of the server. The operator of any terminal can be access to the server to obtain the information he or she needs. In general, the operator inputs a row of characters, called "URL," in order to access the information available on the Internet.

As is known, there is the trend that the terminal operator usually wants to access particular information stored in the server. To access the information by doing an operation as little as possible, the operator may use a function known as "bookmark." The bookmark function enables the operator to have access to the information when he or she selects a row of characters or an icon that designates the information. By performing this function, the terminal operator can access the information more quickly than in the case where he or she designates the information by inputting an URL or the like, which is longer row of characters.

The technique mentioned above is implemented in household electric devices, as well as so-called personal computers. Particularly, information terminals called "digital televisions" can not only receive broadcast information, but also have access to specified information because they are connected to the network.

In the function of bookmark, however, one row of characters represents no more than the location of the information. The process performed by the use of the bookmark is limited to an access to the location where the information exists. The bookmark cannot initiate any other operations. A person may put bookmarks to the network addresses of many other people (audience) in order to give information to them via the network. In this case, the audience cannot manage the bookmarked addresses.

When a person applies an entry for a prize contest or a lottery through the Internet in the conventional information systems, the response to the application reaches him or her in the form of character data, though the character data may includes an image in some cases. To receive the prize or get a ticket reserved, for example, that person needs to read the character data carefully and perform some operation that is usually wearisome.

In the conventional information retrieve systems, even if the person who has applied an entry for a prize contest or a lottery receives a response in the form of image data, he or she must scroll the terminal screen or have access to other sites in order to retrieve the detailed information about the image data. Usually, he or she needs to spend for a long time to retrieve the information and can hardly understand the information at a glance.

DISCLOSURE OF THE INVENTION

The present invention has been made in consideration of the foregoing. An object of the invention is to provide a data-recording medium, a data-displaying apparatus, a data-providing apparatus and a data-providing system, each of which is useful in the course of exchanging information with other people through communications means such as telephone lines or dedicated lines, radio waves or optical communication. The data-recording medium, the data-displaying apparatus, the data-providing apparatus and data-providing system may be of the type that is user-friendly in, for example, applying an entry for a prize contest or a lottery by using a novel icon that makes it easy for the user to access data sources, retrieve data from the sources and file the data.

The invention has been made in view of the above. Another object of the invention is to provide a data-recording medium, a data-displaying apparatus, a data-providing apparatus and a data-providing system, each of which is useful in the course of exchanging information with other people through communications means such as telephone lines or dedicated lines, radio waves or optical communication, by using a novel icon which can be recognized at a glance and which makes it easy for the user to access data sources, retrieve data from the sources and file the data.

To achieve the object, a data-recording medium according to the invention stores a second management-region program which is to be executed by a computer. The program describes the steps of :preparing a second management region on a display screen, in addition to a first management region; determining whether an icon-moving command is input to move a primary icon from the first management region into the second management region; extracting primary related information when the icon-moving command is input; said primary related information being one related to the primary icon but not displayed in the first management region; displaying the first icon in the second management region when an icon-moving command is made; displaying the primary related information in association with the primary icon displayed in the second management region, when a prescribed condition is satisfied; causing the computer to perform a prescribed process when at least one item of the primary related information displayed is selected, thereby to display in the secondary management region a secondary icon that is related to the primary icon information; and causing the computer to process a prescribed process to access a data providing server via a communications means when at least one of related information items related to the primary icon, the secondary icon and lower-order icons is selected, thereby to acquire, from the data-providing server, a result-obtaining icon selected in accordance with conditions stored in the computer and/or a computer doing these steps and then to display the icon, thus acquired, in the second management region.

To attain the object specified above, a data-displaying apparatus of the present invention comprises: first management-region preparing means for preparing a first management region on a display screen; second management-region preparing means for displaying a second management region on the display screen, in addition to the first management region; determining means for determining whether an icon-moving command is input to move a primary icon from the first management region into the second management region;

information-extracting means for extracting primary related information when the icon-moving command is input, said primary related information being one related to the primary icon but not displayed in the first management region; icon-displaying means for displaying the first icon in the second management region when an icon-moving command is made; information-displaying means for displaying the primary related information in association with the primary icon displayed in the second management region, when a prescribed condition is satisfied; icon-requesting means for acquiring the secondary icon from the data-providing server into the second management region via a communications means when the primary related information displayed or at least one of secondary and lower-order related information items read from the primary related information is selected; and process means for causing the computer to process a prescribed process to access a data providing server via the communications means when at least one of related information items related to the primary icon, the secondary icon and lower-order icons is selected, thereby to acquire, from the data-providing server, a result-obtaining icon selected in accordance with conditions stored in the computer and/or a computer doing these steps and then to display the icon, thus acquired, in the second management region.

To accomplish the above-mentioned object, a data-providing apparatus according to this invention provides a user with a second management-region program to be executed by a computer, via a communications means when a prescribed condition is satisfied. The second management-region program describes the steps of: preparing a second management region on a display screen, in addition to a first management region; determining whether an icon-moving command is input to move a primary icon from the first management region into the second management region; extracting primary related information when the icon-moving command is input, said primary related information being one related to the primary icon but not displayed in the first management region; displaying the first icon in the second management region when an icon-moving command is made; displaying the primary related information in association with the primary icon displayed in the second management region, when a prescribed condition is satisfied; causing the computer to perform a prescribed process when at least one item of the primary related information displayed is selected, thereby to display in the secondary management region a secondary icon that is related to the primary icon information; and causing the computer to process a prescribed process to access a data providing server via a communications means when at least one of related information items related to the primary icon, the secondary icon and lower-order icons is selected, thereby to acquire, from the data-providing server, a result-obtaining icon selected in accordance with conditions stored in the computer and/or a computer doing these steps and then to display the icon, thus acquired, in the second management region.

In the data-providing apparatus, the prescribed condition may be that a client terminal supplies a request signal to the apparatus.

To achieve the object described above, a first data-providing apparatus of the invention comprises: primary-data supplying means for supplying primary data containing primary icon information that contains primary related information, to a client terminal through a communications means, in accordance with a prescribed condition; and icon supplying means for providing a result-displaying icon related to a result of a prize contest, a lottery or reservation, to the client terminal via the communications means, when a result-reporting menu is selected at the client terminal and the icon supplying means therefore receives a result-reporting signal relating to the result-reporting menu, said result-reporting menu contained in the primary related information included in the primary icon information or secondary icon or lower-order icon information that has been read from the primary icon information, or contained in secondary related information or lower-order related information read from the primary related information.

A second data-providing system according to this invention comprises: primary data supplying means for supplying primary data containing a primary icon information that contains primary related information, to a client terminal through a communications means, in accordance with a prescribed condition; application-condition column supplying means for transmitting information about a column in which conditions of application will be input, to the client terminal, when an application menu is selected at the client terminal and the application-condition column supplying means therefore receives an application signal relating to the application menu, said application menu contained in the primary related information included in the primary icon information or secondary icon or lower-order icon information that has been read from the primary icon information, or contained in secondary related information or lower-order related information read from the primary related information; condition-storing means for storing application conditions input at the client terminal; result-operating means for calculating the result of the prize contest, the lottery or the reservation from the application conditions stored in the condition-storing means and other conditions; and icon-supplying means for transmitting to the client terminal a result-obtaining icon that corresponds to the result calculated by the result-operating means.

Preferably, the data-providing apparatus according to the invention may further comprise secondary-data supplying means. The secondary-data supplying means supplies secondary data and lower-order data representing a prescribed menu, to the client terminal via the communications means, when the prescribed menu is selected at the client terminal and the secondary-data supplying means therefore receives a selection signal relating to the prescribed menu. The prescribed menu is contained in the primary related information included in the primary icon information. Alternatively, the menu may be contained in secondary related information or lower-order related information that has been read from the primary icon information.

In the present invention, it is desired that image information for displaying the icon should contain at least the primary related information.

The means of embedding related information in the image data showing an icon is not limited to a particular one. If the image data is a JPEG file, a GIF file, or the like, the related information can be described in the remark section, as information that imposes no influence on the displaying of an image represented by this data configuration. Even if the image data is of any other format that has an information region that imposes no influence on the displaying of the image, it can be described in that information region. Moreover, the related information can be added to the image data by applying digital watermark technology.

At least one of related information items related to the primary icon, the secondary icon and lower-order icons may be an application menu for applying an entry for a prize contest, a lottery or reservation. Alternatively, at least one of related information items related to the primary icon, the secondary icon and lower-order icons may be a menu for requesting for the result of a prize contest, a lottery or reservation.

Preferably, a column in which application conditions may be input is displayed in the first management region when the application menu is selected.

The result-obtaining icon may contain a result-reporting menu related to the result of the prize contest, lottery or reservation. The result may be described as character data. A result-displaying icon showing the result of the prize content, lottery or reservation may be displayed in the second management region when the result-reporting menu, for example, is selected. In this case, the user can know the result, just looking at the icon.

The result-displaying icon may be replaced by the result-obtaining icon, or may be displayed along with the result-obtaining icon. Alternatively, the result-displaying icon may be superimposed on the result-obtaining icon.

The result-displaying icon and/or result-obtaining icon may contain a menu for acquiring information concerning the prize contest, a lottery or reservation, if the result thereof turned out to be negative. Other similar menus are not limited to particular ones. Nonetheless, a menu for selecting a ticket other than the ticket the user could not get by reservation. Another example of such a menu is one that introduces the audio apparatuses that the information source recommends.

In this invention, the result-obtaining icon may be an icon that displays the result of a prize contest, a lottery or reservation, which should be determined from the conditions of application for an entry in the content or lottery or the conditions of reservation. Alternatively, the result-obtaining icon may be the secondary icon or any lower-degree icon.

In the invention, the result-displaying icon represents the result of, for example, a prize contest, a lottery or reservation. The result-displaying icon may be replaced by a result-obtaining icon or may be generated from the result-obtaining icon.

In the present invention, any icon can be either a primary one or a secondary one is quite arbitrary. That is, a secondary icon or any lower-order icon can be a primary icon, because the next icon is generated from it. Similarly, any related information can be primary related information or secondary related information.

A data-displaying apparatus according to the invention may further comprise icon-requesting means for acquiring the secondary icon from a source of the icon via a communications means. The secondary icon, which represents the primary related information in greater detail than the primary icon, can therefore be displayed in association with the primary related information. Likewise, the third-order related information, which is related to the secondary related information, may be displayed. The secondary related information and any lower-order related information may be contained in the icon information, together with the primary related information.

In the invention, the secondary related information and any lower-order related information may be displayed in the second management region, near the primary related information. Alternatively, they may be displayed in the first management region.

The second management-region program may further comprise a step of determining whether it has been installed into the computer and a step of notifying its installation or executing itself if it has been installed into the computer.

In the present invention, the communications means is not limited to a specific one. The communications means may be telephone lines, dedicated lines, radio waves or optical communication.

The icons are not limited to particular lines in the present invention. They may be sill pictures or moving pictures. Moreover, the icons may be a part of the image. Preferably, the secondary icon should be distinct from the primary icon. Nevertheless, it may be identical to the primary icon. Whichever type of a secondary icon can be obtained, merely by selecting the primary related information displayed in association with the primary icon or at least one of the secondary and lower-order related information items read from the primary related information.

The primary icon displayed in the second management region may be replaced with a secondary icon. Alternatively, the secondary icon may be displayed in the second management region, along with the primary icon.

Related information is not particularly limited in the present invention. It may be, for example, basic information that helps the user to perform a specific operation in accordance with the icon information. The related information may include an icon identifier. In short, the related information is related to the icon. It may be data (e.g., URL or IP address) that helps the user identify the information that is stored in a particular server. Instead, it may be a particular program or the name thereof if the user wants to execute the program. The related information is not necessarily provided as a plurality of data items. If it is provided in the form of a single data item, it will be automatically processed immediately after the user moves the icon into the second management region.

The related information is displayed in the form of a menu. It is character data in most cases. Nevertheless, it may be a mark, a symbol, an image or the like.

The data-recording medium according to the invention is not limited to a particular one. It may be a CD-ROM, a hard disc, a magneto-optic disc, a DVD, a floppy disc, a semiconductor disc (RAM disc or the like), an IC-card memory, magnetic tape, or the like.

The data-displaying apparatus according to this invention is not limited to a specific one. It may be a personal computer, a general-purpose computer, a digital TV set, or a portable terminal such as a PDA (Personal Data Assistance). (The PDA includes a mobile telephone.)

In the data-recording medium, data-displaying apparatus, data-providing apparatus and data-providing system, all according to this invention, the image data representing an icon is not displayed in the first management region. The image data is associated with primary related information that can be displayed in the second management region in specific conditions. The user can therefore know the contents of the information identified with the icon, just looking at the icon displayed in the first management region. To know the information related to the icon more specifically or to buy the goods (or service) corresponding to the icon, the user needs only to move the icon into the second management region. The user can then read the primary related information in the form of, for example, a menu.

The user may select one of the items of primary related information displayed as a menu in the second management region. Then, a process on the icon can be performed. For example, the homepage transmitted on the Internet and relating to the icon can be displayed in the first management region, or the user can buy good or service that corresponds to the icon. In this invention, the user uses the icon and thereby retrieves desired information, making access to the source of the information. Thus, it is easy to retrieve the information and have access to the source of the information. The user can recognize, at a glance, the icons that represent various types of information. This helps the user to file information and use the information efficiently if the icons are filed in, for example, a directory format, a tree format, or a tag format.

In the invention, when the user selects the primary related information or at least one of the secondary and lower-order related information items, the computer performs a prescribed process, having access to a data-providing server via the communications means. Then, a result-obtaining icon selected in accordance with conditions stored in the computer or the computer is acquired from the data-providing server and displayed in the second management region.

Hence, the user can get the outcome of a prize contest, a lottery or reservation easily and quickly by using the result-obtaining icon as a result-displaying icon that displays the result of the content, lottery or reservation.

The user may select, as related information, a scratch menu (i.e., a result-reporting menu) from the primary icon, the secondary icon or any lower-order icon, all displayed in the second management region. If so, the user can immediately know the result, just reading the scratch menu. The result-obtaining icon can contain a menu (i.e., related information) that shows the procedure the user needs to take to receive goods (or service). That is, it is easy for the user to take the procedure after the result of a prize content or the like is announced.

The result-obtaining icon needs not be one that directly represents the outcome of the prize contest, lottery or reservation. Rather, it may be any icon that helps the user to know the result of the contest, lottery or reservation. In other words, the result-obtaining icon may contain, as related information, a result-reporting menu that shows the outcome of the content, lottery or reservation.

The result-reporting menu may be character data. Instead, it may be displayed as an icon in the second management region, indicating the outcome of the prize content, lottery or reservation.

The primary icon, the secondary icon and any lower-order icon may contain, as related information, an application menu for a prize content, a lottery or reservation. In this case, an application-condition column will be displayed in the first management region if the user selects the application menu. In the application-condition column there can be written the application conditions for a prize content, a lottery or reservation. The application conditions are the goods (service) obtainable if the user wins the content or lottery or the various conditions of reservation. After inputting the application conditions, the user applies for an entry in the content, lottery or reservation. In the data-providing server, the result of application is acquired in accordance with the application conditions and the prescribed rules. The result thus acquired is transmitted, as the result-obtaining icon, to the user's data-displaying apparatus. In the user's data-displaying apparatus, the result-obtaining icon is displayed in the second management region. As indicated above, the result-obtaining icon may be one that directly represents the outcome of the contest, lottery or reservation or one from which is used to obtain the result.

In this invention, the result of a prize content, a lottery or reservation is read from the data-providing server and displayed in the form of an icon, which the user can understand at once. As described above, the result-obtaining icon contains, as related information, a menu (i.e., related information) that shows the procedure the user needs to take to receive goods (or service). Therefore, it is easy for the user to take the procedure after the result of the content or the like is announced.

The result-displaying icon and/or the result-obtaining icon may contain a menu for acquiring information concerning the prize contest, a lottery or reservation, if the result thereof turned out to be negative. For example, the icon may contain a menu that enables the user to obtain information about vacant seats or reserve a ticket for another seat, if he or she fails to get the desired seat by reservation. This may stimulate the user to buy a ticket for another seat.

To attain the object specified above, a data-recording medium according to the invention stores a second management-region program that is to be executed by a computer. The second management-region program describes the steps of: preparing a second management region on a display screen, in addition to a first management region; determining whether an icon-moving command is input to move a primary icon from the first management region into the second management region; extracting primary related information when the icon-moving command is input, said primary related information being one related to the primary icon but not displayed in the first management region; displaying the first icon in the second management region when an icon-moving command is made; displaying the primary related information in association with the primary icon displayed in the second management region, when a prescribed condition is satisfied; and causing the computer to perform a prescribed process when the primary related information displayed or at least one of secondary and lower-order related information items read from the primary related information is selected, thereby to display in the secondary management region a secondary icon that is related to the primary icon information.

The secondary icon may be acquired from a data-providing server via a communications means when the primary related information or at least one of secondary and lower-order related information items read from the primary related information is selected.

In order to achieve the object specified above, a data-displaying apparatus according to the present invention comprises: first management-region preparing means for preparing a first management region on a display screen; second management-region preparing means for displaying a second management region on the display screen, in addition to the first management region; determining means for determining whether an icon-moving command is input to move a primary icon from the first management region into the second management region; information-extracting means for extracting primary related information when the icon-moving command is input, said primary related information being one related to the primary icon but not displayed in the first management region; icon-displaying means for displaying the first icon in the second management region when an icon-moving command is made; information-displaying means for displaying the primary related information in association with the primary icon displayed in the second management region, when a prescribed condition is satisfied; and process means for causing the computer to process a prescribed process to display a secondary icon related to the primary icon, in the second management region, when the primary related information displayed or one of secondary and lower-order related information items read from the primary related information is selected.

The data-displaying apparatus may preferably further comprise icon-requesting means for acquiring the secondary icon from a data-providing server via a communications means when the primary related information or at least one of secondary and lower-order related information items read from the primary related information is selected.

To attain the object pointed out above, a data-providing apparatus according to the invention provides a user with a second management-region program to be executed by a computer, via a communications means when a prescribed condition is satisfied. The second management-region program describes the steps of: preparing a second management region on a display screen, in addition to a first management region; determining whether an icon-moving command is input to move a primary icon from the first management region into the second management region; extracting primary related information when the icon-moving command is input, said primary related information being one related to the primary icon but not displayed in the first management region; displaying the first icon in the second management region when an icon-moving command is made; displaying the primary related information in association with the primary icon displayed in the second management region, when a prescribed condition is satisfied; and causing the computer to perform a prescribed process when the primary related information displayed or at least one of secondary and lower-order related information items read from the primary related information is selected, thereby to display a secondary icon related to the primary icon information, in the secondary management region.

The prescribed condition may be that a client terminal supplies a request signal to the apparatus via the communications means.

To accomplish the object described above, a data-providing system according to this invention comprises: primary-data providing means for supplying primary data containing a primary icon information that contains primary related information, to a client terminal through a communications means, in accordance with a prescribed condition; and icon-providing means for supplying a secondary icon to a client terminal via the communications means when an icon-requesting menu is selected at the client terminal and the icon-providing means receives an icon-requesting signal about the icon-requesting menu, said icon-requesting menu contained in the primary related information included in the primary icon information or secondary icon or lower-order icon information that has been read from the primary related information.

Preferably, the data-providing system may further comprises secondary-data providing means for supplying the secondary and lower-order related information relating to the icon-requesting menu, to the client terminal via the communications means, when an icon-requesting menu is selected at the client terminal and the icon-providing means receives an icon-requesting signal about the icon-requesting menu, said icon-requesting menu contained in the primary related information included in the primary icon information or the secondary icon or lower-order icon information that has been read from the primary related information.

In the present invention, it is desired that image information for displaying the icon should contain at least the primary related information.

The means of embedding related information in the image data showing an icon is not limited to a particular one. If the image data is a JPEG file, a GIF file, or the like, the related information can be described in the remark section, as information that imposes no influence on the displaying of an image represented by this data configuration. Even if the image data is of any other format that has an information region that imposes no influence on the displaying of the image, it can be described in that information region. Moreover, the related information can be added to the image data by applying digital watermark technology.

The secondary icon is not limited to a particular one, so long as it is distinct from the primary icon. Nevertheless, it is desired that the secondary icon should represent the information related to the primary icon. If the primary icon is a side perspective view of a new car, the secondary icon may be a side view of the car, a front view thereof, or an interior view thereof. If the primary icon is an overall view of the goods, the secondary icon may be a magnified view of a part of the goods. Whichever type of a secondary icon can be obtained, merely by selecting the primary related information displayed in association with the primary icon or at least one of the secondary and lower-order related information items read from the primary related information. The related information is displayed in the form of, for example, a menu. It is character data in most cases. Nonetheless, it may be a mark, a symbol, an image or the like.

In the present invention, any icon can be either a primary one or a secondary one is quite arbitrary. That is, a secondary icon or any lower-order icon can be a primary icon, because the next icon is generated from it. Similarly, any related information can be primary related information or secondary related information.

A data-displaying apparatus according to the invention may further comprise icon-requesting means for acquiring the secondary icon from a source of the icon via a communications means. The secondary icon, which represents the primary related information in greater detail than the primary icon, can therefore be displayed in association with the primary related information. Likewise, the third-order related information, which is related to the secondary related information, may be displayed. The secondary related information and any lower-order related information may be contained in the icon information, together with the primary related information. In the invention, the secondary related information and any lower-order related information may be displayed in the second management region, near the primary related information. Otherwise, they may be displayed in the first management region.

The second management-region program may further comprise a step of determining whether it has been installed into the computer and a step of notifying its installation or executing itself if it has been installed into the computer.

In the present invention, the communications means is not limited to a specific one. The communications means may be telephone lines, dedicated lines, radio waves or optical communication.

The icons are not limited to particular lines in the present invention. They may be sill pictures or moving pictures. Moreover, the icons may be a part of the image.

Related information is not particularly limited in the present invention. It may be, for example, basic information that helps the user to perform a specific operation in accordance with the icon information. The related information may include an icon identifier. In short, the related information is related to the icon. It may be data (e.g., URL or IP address) that helps the user identify the information that is stored in a particular server. Instead, it may be a particular program or the name thereof if the user wants to execute the program. The related information is not necessarily provided as a plurality of data items. If it is provided in the form of a single data item, it will be automatically processed immediately after the user moves the icon into the second management region.

The primary icon displayed in the second management region may be replaced with a secondary icon. Alternatively, the secondary icon may be displayed in the second management region, along with the primary icon.

The data-recording medium according to the invention is not limited to a particular one. It may be a CD-ROM, a hard disc, a magneto-optic disc, a DVD, a floppy disc, a semiconductor disc (RAM disc or the like), an IC-card memory, magnetic tape, or the like.

The data-displaying apparatus according to this invention is not limited to a specific one. It may be a personal computer, a general-purpose computer, a digital TV set, or a portable terminal such as a PDA (Personal Data Assistance). (The PDA includes a mobile telephone.)

In the data-recording medium, data-displaying apparatus, data-providing apparatus and data-providing system, all according to this invention, the image data representing an icon is not displayed in the first management region. The image data is associated with primary related information that can be displayed in the second management region in specific conditions. The user can therefore know the contents of the information identified with the icon, just looking at the icon displayed in the first management region. To know the information related to the icon more specifically or to buy the goods (or service) corresponding to the icon, the user needs only to move the icon into the second management region. The user can then read the primary related information in the form of, for example, a menu.

The user may select one of the items of primary related information displayed as a menu in the second management region. Then, a process on the icon can be performed. For example, the homepage transmitted on the Internet and relating to the icon can be displayed in the first management region, or the user can buy goods or service that corresponds to the icon. In this invention, the user uses the icon and thereby retrieves desired information, making access to the source of the information. Thus, it is easy to retrieve the information and have access to the source of the information. The user can recognize, at a glance, the icons that represent various types of information. This helps the user to file information and use the information efficiently if the icons are filed in, for example, a directory format, a tree format, or a tag format.

In the invention, the primary related information or at least one of the secondary and lower-order related information items read from the primary related information is a menu that is related to the primary icon but is a menu for requesting the secondary icon. Hence, the secondary icon can be displayed in the second management region, without being moved through the first management region.

Although the secondary icon is related to the primary icon, but is a different icon. The secondary icon is, for example, detailed information about the primary icon. Hence, the user can quickly acquire the icon relating to the detailed information in order to obtain the detailed information. The user can know the contents of the information, just looking at the icon. The user can acquire other information about the secondary icon, in the same way as he or she acquires the secondary icon from the primary icon.

BEST MODE FOR CARRYING OUT THE INVENTION

Embodiments of the present invention will be described, with reference to the accompanying drawings.

FIRST EMBODIMENT

Figure 1:
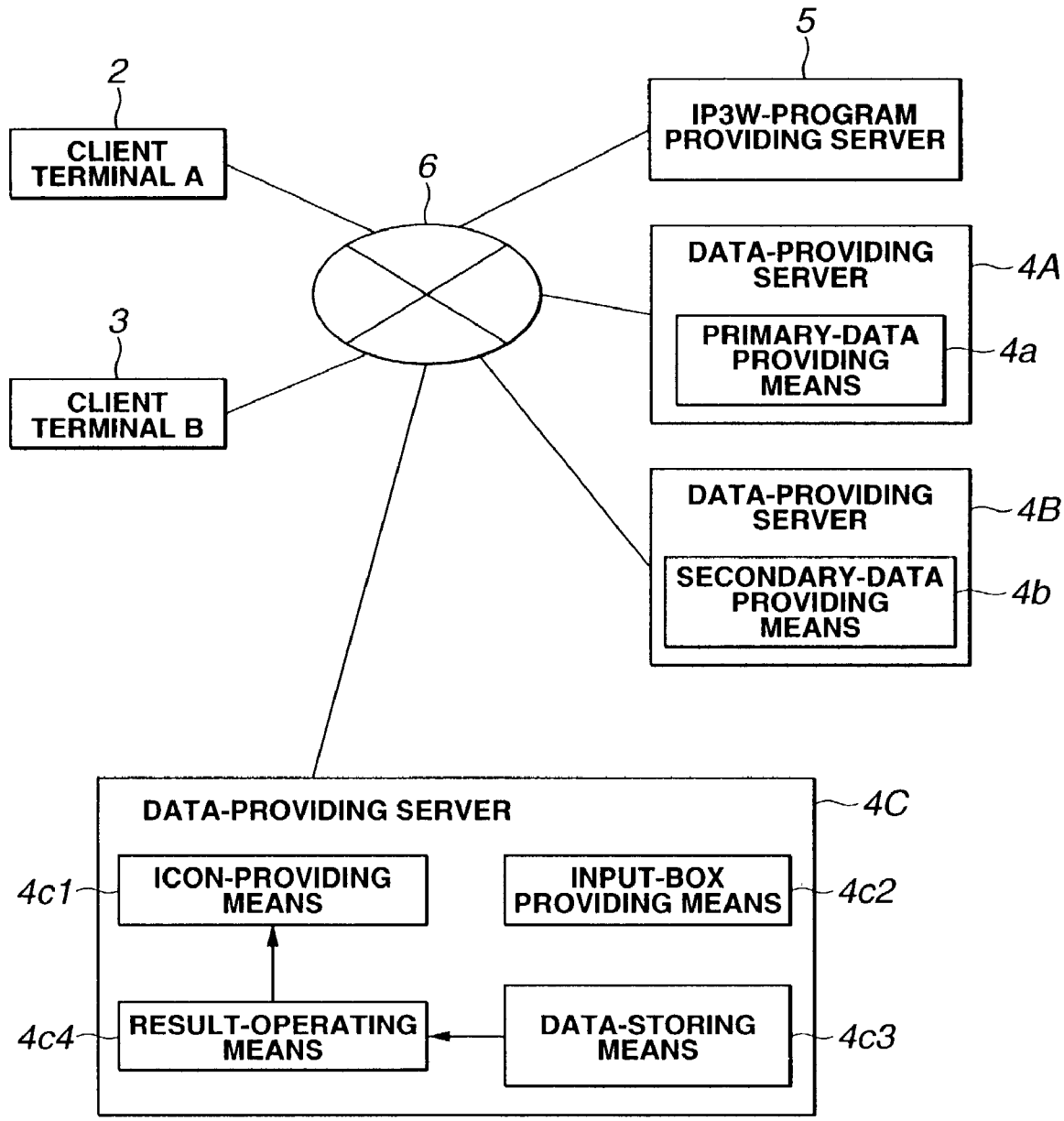
FIG. 1 is a diagram showing the overall structure of a system according to one embodiment of the present invention.

As seen from FIG. 1 showing its overall structure, a data communications system according to the present embodiment of this invention has a plurality of client terminals 2 and 3, and a plurality of data-providing servers 4A, 4B, 4C and 5. Data communication can be achieved among the terminals and the servers via a network 6. In this invention, the communications means for the network 6 is not limited to a specific one. Rather, the telephone lines, dedicated lines, radio waves or optical communication, or any possible combination of these. Nonetheless, the network 6 is of the Internet in the present embodiment.

The client terminals 2 and 3 are not limited to a particular type. They may be digital TV sets, PDAs, or the like. In the present embodiment, they will be described as personal computers. The client terminals 2 and 3 are identical in structure. Only the client terminal 2 will be described below, and the client terminal 3 will not.

The servers 4A, 4B 4C and 5 are, for example, general-purpose computers. Each of the computers comprises at least a CPU or a MPU, memories, a data storage device, a communications interface, display device, and input devices. The memories are, for example, a RAM and a ROM. The data storage device may be a hard disc drive. The communications interface may be a modem or a terminal adapter. The display device are, for example, a CRT and an LCD. The input devices are, for instance, a mouse and a keyboard.

The storage device and/or memories incorporated in each client terminal, i.e., a personal computer, store at least an operating system (OS) and some programs including HTTP browser software (e.g., Web browser or the like) and mail-transmitting/receiving software. Hence, the client terminal can transmit and receive information through the network 6. The storage device and/or memories provided in each server, store at least an operating system (OS) and some programs including HTTP server software, so that the server may provide and transmit content information through the network 6.

In this embodiment, the data-providing server 4A provides mainly the information about the first management region of the present invention. The data-providing server 5 provides chiefly the second information about the second management region program (hereinafter also referred to as "IP3W program"). The data-providing server 4B receives the primary data from the data-providing server 4A and outputs the secondary data, or the detailed information related to the primary data. If the primary data contains data items introducing companies, the secondary data represents more detailed information about the companies. The data-providing server 4C provides result icons and/or result-displaying icons. A result icon represents the outcome of a prize contest or a lottery when it is clicked. A result-display icon displays the outcome of the contest or lottery when it is clicked.

In the present invention, the servers 4A, 4B, 4C and 5 may be of different types or of the same type. It may be generally considered that the server 5 differs from the other servers 4A, 4B and 4C. However, the serves 4A, 4B and 4C may be identical to the server 5. Particularly, the server 4B and 4C can be identical to the server 5.

Of the data-providing servers 4A, 4B and 4C incorporated in the present embodiment, the data-providing server 4A has a primary-data providing means 4a as is illustrated in FIG. 1. The data-providing server 4B has a secondary-data providing means 4b. The data-providing server 4C comprises a means 4c1 for providing other icons, a means 4c2 for inputting an application-condition column, a data-storing means 4c3 for storing the data representing the application conditions input by clients, and a result-operating means 4c4.

Figure 5:
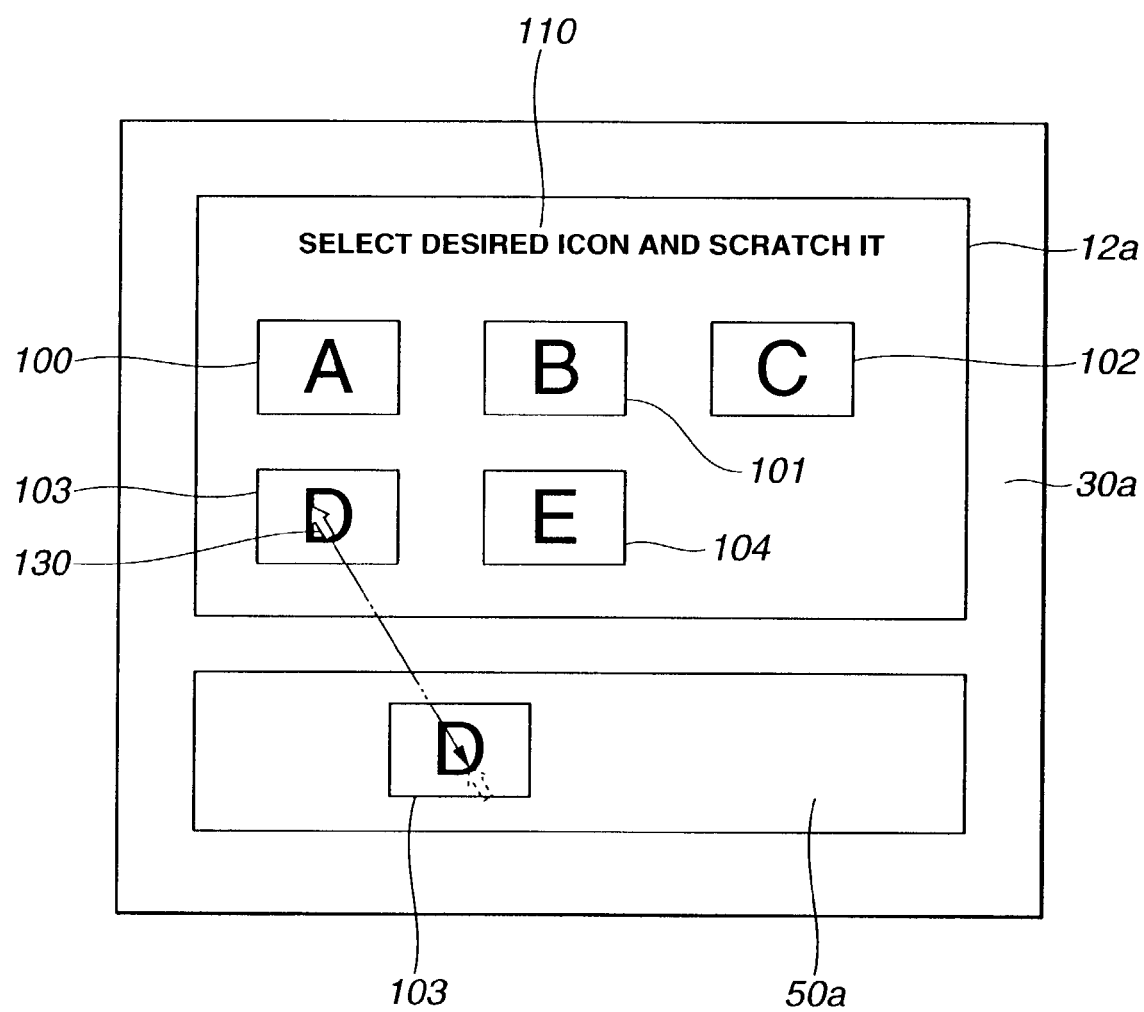
FIG. 5 is a diagram depicting an example of information displayed on the screen of a client terminal.

The primary-data providing means 4a is designed to provide such content information as is displayed in the first management region 12a on the screen 30a of a client terminal, as is illustrated in FIG. 5. In this embodiment, the content information supplied from the primary-data providing means 4a incorporated in the data-providing server 4A contains at least one of primary icons 100 to 104 and character data 110 as is shown in FIG. 5.

The primary icons 100 to 104 help the user to understand, at a glance, what information the data-providing server 4A can supply. The secondary icons and the lower-order icons, which will be later described, serve the same purpose. The information shown in FIG. 5 includes five icons 100 to 104 (A to E) represent five choices presented in a prize contest or in a lottery. (Icons 100 to 104 may be replaced by characters or signs.) The number of icons is not limited to five. More icons or fewer icons may be displayed on the screen 30a.

In the present embodiment, the primary icons 100 to 104 contains related information each, like the secondary icons and lower-order icons that will be later described. The related information is not displayed, however, in the first management region 12a illustrated in FIG. 5. Only the icons 100 to 104 are displayed in the first management region 12a.

The method of embedding the related information in the image data is not limited to particular ones. Nonetheless, the following method may be employed to embed the related information into the image data.

Figure 3:
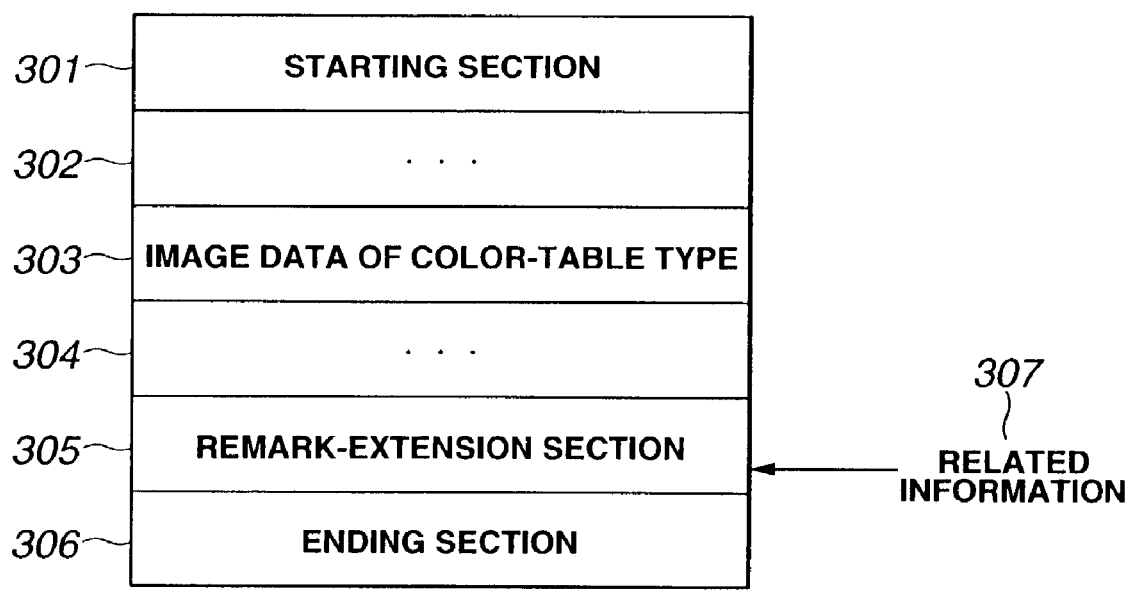
FIG. 3 is a schematic representation of an example of the process of embedding related information into image data.

FIG. 3 depicts a format of the image data in which the related information embedded.

The image data is of, for example, GIF format. This does not mean that the format is limited to GIF format. Rather, the image data may be of JPG format or PCX format.

As FIG. 3 shows, the starting section 301 is a field that is provided to indicate that the information is image data of the GIF format. The row of characters, "GIF," and the version number thereof are allocated to the starting section 301.

The image data 303 of color-table type is image data representing pixels that are arranged from the left to the right, from the top to the bottom. If the image data is of the GIF format, it is encoded by LZW algorithm for variable-length codes.

The remark-extension section 305 contains character data that cannot be graphic information included in a GIF data steam. The character data may represent the remarks on the graphics, the producer thereof and the contents thereof. Further, the character data may contain control data items and other data items excluding graphic data items.

The ending section 306 is a field provided to indicate that the data stream has come to its end. Namely, the section 306 indicates that no other parameter data or the like follows the data stream.

A section 302 is inserted between the starting section 301 and the image data 303 of color-table type. Another section 304 is inserted between the image data 303 and the remark-extension section 305. These items of information are, for example, the parameters that define a screen region of a display in which an image will be displayed. The parameters are data items required to define the screen region, such as the width, the height and the color-resolution, all pertaining to the screen region.

The related information 307 is set in the remark-extension section 305 after it is encrypted or not encrypted at all. The remark-extension section 305 and the related information 307 are combined, thus providing an item of image data.

The image data in the form of a data stream can therefore contain the related information.

What has been explained above is all based on the assumption that the data format is GIF format. Nonetheless, any other format can be applied so long as the related information is recorded in a region isolated from the region where image data is recorded.

Figure 4:
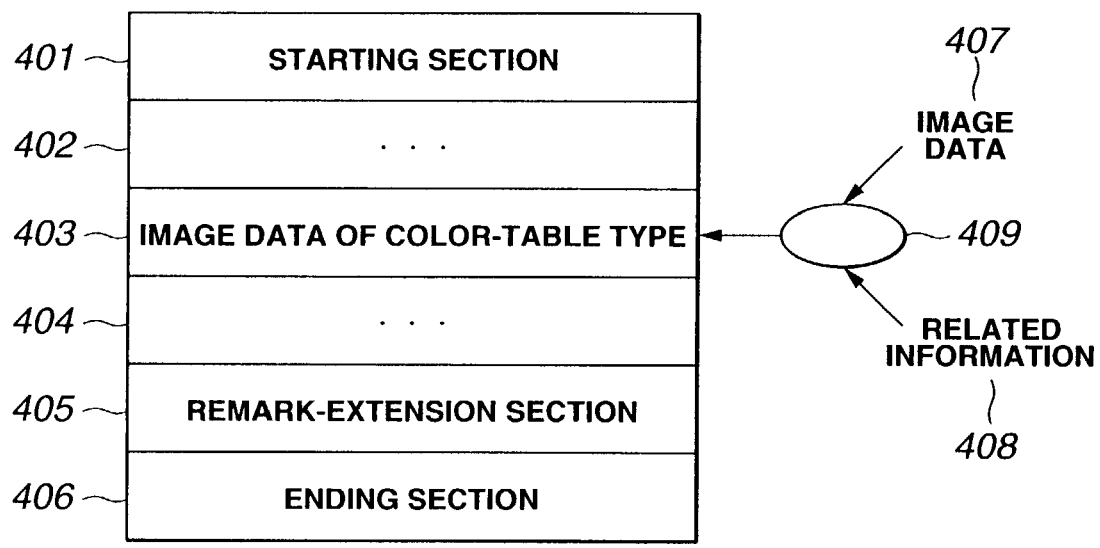
FIG. 4 is a schematic representation of another example of the process of embedding related information into image data.

How the related information is embedded in the image data will be described with reference to FIG. 4. FIG. 4 shows another format of image data in which the related information is embedded.

The format of FIG. 4 is GIF format, too. The format need not be GIF format, nevertheless. The image data may be of JPG format or PCX format.

As seen from FIG. 4, the starting section 401 is a field that is provided to indicate that the information is image data of the GIF format. The row of characters, "GIF," and the version number thereof are allocated to the starting section 401.

The image data 403 of color-table type differs from the image data 303 that represents pixels that are arranged from the left to the right, from the top to the bottom. That is, the image data 403 is mixed data 409 that consists of image data 407 and related information 408. The related information is recorded in the form of a watermark and cannot be seen, while the image data remains visible. The mixed data 409 is encoded by LZW algorithm for variable-length codes.

The remark-extension section 405 contains the character data that cannot be graphic information included in a GIF data steam. The section 405 is a field that is not absolutely necessary in the format of FIG. 4. The user can use the section 405 if necessary, in whichever definition he or she gives to it.

The ending section 406 is a field provided to indicate that the data stream has come to its end. In other words, this section 406 indicates that no other parameter data or the like follows the data stream. Note that the intermediate sections 402 and 404 of this data stream correspond to the sections 302 and 304 that are illustrated in FIG. 3.

The image data is of the GIF format as shown in FIG. 4. Nonetheless, any other format can be applied, provided that the related information items are recorded in regions isolated from the region where image data is recorded.

The related information is thus embedded in the icon image information. Content information that contains a plurality of image data items, each including the related information, may be transmitted to the client terminal 2 from the primary-data providing means 4a of the data-providing server 4A shown in FIG. 1. In practice, the client terminal 2 make access to the content-providing server 4A through the network 6 and then acquires the content information from the first management region 12a of the content-providing server 4A.

The terminal 2 has the commercially available browser that can cause a display to show the first management region 12a. Therefore, as shown in FIG. 5, a plurality of icons 100 to 104 are displayed in the first management region 12a on the screen 30a of the client terminal 2. In this embodiment, the first management region 12a is a communications window that can be displayed by means of a browser such as the Internet Explorer. Ordinary browsers cannot cause displays to show the related information contained in the icons 100 to 104.

The data-providing server 5, the client terminals 2 and 3 and the icons 100 to 104 contain related information each. The related information can be displayed by executing IP3W program. To set the IP3W program into any client terminal, the user of the client terminal may obtain a data-recording medium, such as a CD-ROM, which holds the IP3W program and may then install the program into the client terminal. Alternatively, the user may connect the client terminal to the data-providing server 5 (FIG. 1) through the network 6 and may then downloads the IP3W program. The data-providing server 5 may manage the information about the clients who wish to download the IP3W program into their own terminals.

The IP3W program is a program for displaying the second management region 50a (a region that can be called "IP3W"), as well as the first management region 12a that is a Web-browser window or the like. The IP3W program therefore serves to perform specific processes relating to the second management region 50a.

The computer provided in the client terminal into which IP3W program or the downloaded from the data-recording medium such as a CD-ROM or which incorporates a dedicated logic circuit equivalent to the IP3W program will be described, with reference to mainly FIG. 2. The particulars of the IP3W program will be apparent from the following description. It may be understood that the IP3W program can be executed on the computer, no matter whichever OS, whichever other software, and whichever hardware are utilized.

Figure 2:
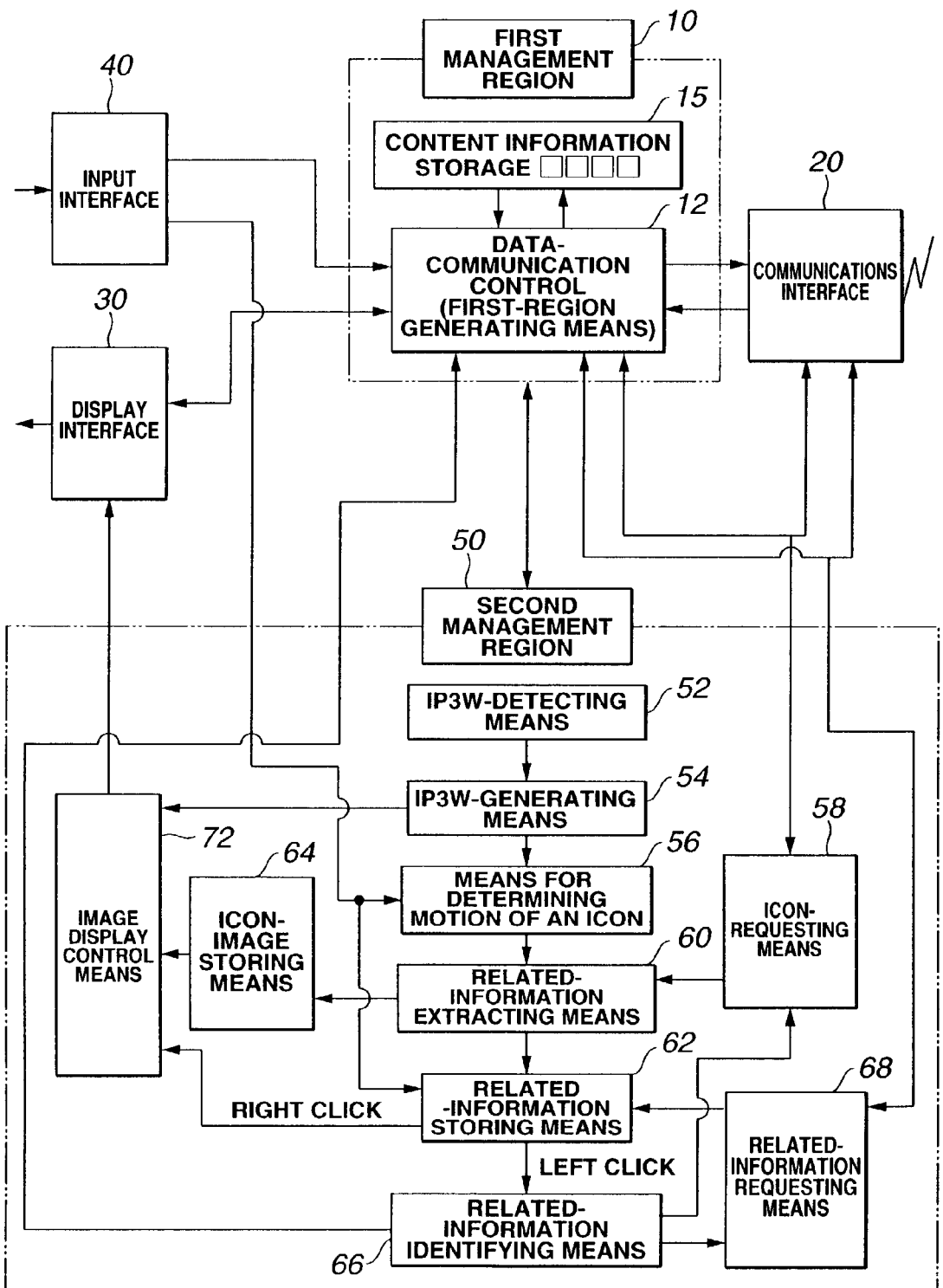
FIG. 2 is a block diagram illustrating the configuration of an embodiment of a client terminal.

As FIG. 2 shows, the client terminal 2 has a first management-region control means 10, a second management-region control means 50, a communications interface 20, a display interface 30, and an input interface 40. The first management-region control means 10 and the second management-region control means 50 comprises a memory, a storage device and a processor, each. The memory and the storage device store various programs (including the OS). The processor is a CPU or a MPU that executes the programs.

The communications interface 20 is, for example, a modem or a terminal adapter. The interface 20 connects the first management-region control means 10 and/or the second management-region control means 50 to the network 6 illustrated in FIG. 1. If the terminal 2 is a PDA, the communications interface 20 may comprise an antenna or the like.

The display interface 30 is a connection device that connects the first management-region control means 10 or the second management-region control means 50, or both, to a display such as a CRT or an LCD. This connection device may be a contact type that connects electric wires or optical fibers. Alternatively, it may be a non-contact type that transmits and receives signals by using a medium such as electric waves, infrared rays or electromagnetic waves. FIG. 5 is a diagram depicting an example of information displayed on the screen of the display.

The input interface 40 is a connection device that connects the first management-region control means 10 and/or the second management-region control means 50 to input devices such as a mouse, a keyboard, a dial, a handle, a stick and a touch panel. This connection device may be a contact type that connects electric wires or optical fibers. Alternatively, it may be a non-contact type that transmit and receive signals by using electromagnetic wave such as electric waves or infrared rays.

The first management-region control means 10 has at least a data-communication control means 12 and a content information storage section 15. (The control means 12 includes a first management-region forming means of the present invention.)

The data-communication control means 12 includes a memory or a storage device and a CPU or an MPU. The memory and/or the storage device stores the programs for accomplishing the Internet communication via the network 6 (FIG. 1). These programs are Internet Explorer or Netscape Navigator. The CPU or MPU executes the programs.

The content information storage section 15 is a section that can store the content information of which the data-communication control means 12 (e.g., Web browser) has acquired via the network 6 and the communications interface 20. The section 15 comprises a memory or a storage device, or both. In the present embodiment, the content information stored in the content information storage section 15 includes the above-mentioned icons 100 to 104.

One of the content information items stored in the content information storage section 15 may be displayed as content information in the first management region 12a, as is illustrated in FIG. 5. The content information shown in FIG. 5 has been transmitted via the network 6 from the data-providing server 4A shown in FIG. 1. The information displayed in the first management region 12a represents five choices presented in a prize contest or in a lottery.

As specified in the detailed description of the IP3W program, the second management-region control means 50 may not be provided before the IP3W program is supplied to the client terminal 2. In this case, it suffices to install the IP3W program into the client terminal 2. The IP3W program can be installed in two alternative methods. In the first method, the program is installed from a removable data-recording medium such as a CD-ROM. In the second method, the program is downloaded from the data-providing server 5 (FIG. 1) that stores the IP3W program.

The IP3W program is downloaded via the network 6 from the data-providing server 5 illustrated in FIG. 1. The details of the IP3W program will be apparent from the following description and the block diagram of FIG. 2. The following description is based on the assumption that the IP3W program has been installed into the computer incorporated in the client terminal 2.

The second management-region control means 50 has a storage device and/or a memory and a CPU and/or a MPU. The storage device and/or the memory can store the IP3W program or other information. The CPU and/or the MPU executes the IP3W program. In this embodiment, the second management-region control means 50 has an IP3W-detecting means 52 configured to detect the IP3W program.

The IP3W-detecting means 52 determines whether the storage device and/or memory of the computer stores the IP3W program or has a logic circuit equivalent to IP3W program. If the means 52 determines that the IP3W program has been installed into the computer, it informs the user of this fact. At the same time or at a different time, the means 54 (IP3W-generating means) for generating the second management region executes the IP3W program, displaying the second management region 50*a* on the screen 30*a* as is shown in FIG. 5. The means 52 may determine whether the IP3W program stored in the computer is of the latest version.

The IP3W-generating means 54, which is shown in FIG. 2, transmits a control signal to an image display control means 72 in order to display the second management region 50*a* (FIG. 5) on the screen 30*a*. The control signal is supplied via the display interface 30 and controls the process of displaying data on the screen 30*a*.

The detecting means 56, which is shown in FIG. 2, can determine whether a command has been input to move at least one of the icons 100 to 104 (FIG. 5) from the first management region 12*a* to the second management region 50*a*. More precisely, the means 56 determines whether or not the user has operated the mouse, moving the pointer 130 on the screen 30*a*, dragging the icon 103 from the first management region 12*a* and to the second management region 50*a* and dropping the icon 103 in the second management region 50*a*.

If the command has been input to move the selected icon 103 from the first management region 12*a* to the second management region 50*a*, an icon identical to the icon 103 displayed in the first management region 12*a* is displayed in the second management region 50*a*.

Once any icon 103 has been moved from the first management region 12*a* into the second management region 50*a*, the related information included in the icon 103 can be displayed.

To understand the information related to the icon 103, in greater detail, by managing the first management region 12*a* only, it has been necessary for the user to read the long sentences contained in the content information (containing unnecessary items). It takes the user a long time to retrieve and obtain the very information he or she wants. Further, the user may push a button to jump to the home page of the contents associated with the icon 103 or may input the address of the home page. In this case, too, the user needs to read many sentences after accessing the home page, in order to retrieve the information he or she wishes to obtain. It is troublesome for him or her to retrieve the very information he or she wants.

With the present embodiment, it is very easy to retrieve the target information, merely by moving the icon 103 from the first management region 12*a* into the second management region 50*a*. Additionally, it is easy to apply an entry for a prize contest or a lottery by moving any icon selected.

As FIG. 2 shows, the related-information extracting means 60 extracts the related information included in the icon 103 selected and displayed in the second management region 50*a* (FIG. 5) in accordance with the data supplied from the icon-motion detecting means 56. That is, the type of the data stream representing the target icon is analyzed, whereby the related information 307 of the type shown in FIG. 3 or the related information 408 of the type shown in FIG. 4 is extracted from the image data stream.

The related information extracted by the extraction means 60 is stored into the related-information storing means 62 illustrated in FIG. 2. The contents of this related information are displayed on the screen if they satisfy prescribed conditions. Meanwhile, the icon information detected by the icon-motion detecting means 56 is stored into the icon-image storing means 64 in accordance with the signal input from the icon-motion detecting means 56 or the related-information extracting means 60. The image-display control means 72 and the display interface 30 operate, displaying the icon represented by the image information stored in the means 64 in the second management region 50*a*.

Figure 6:
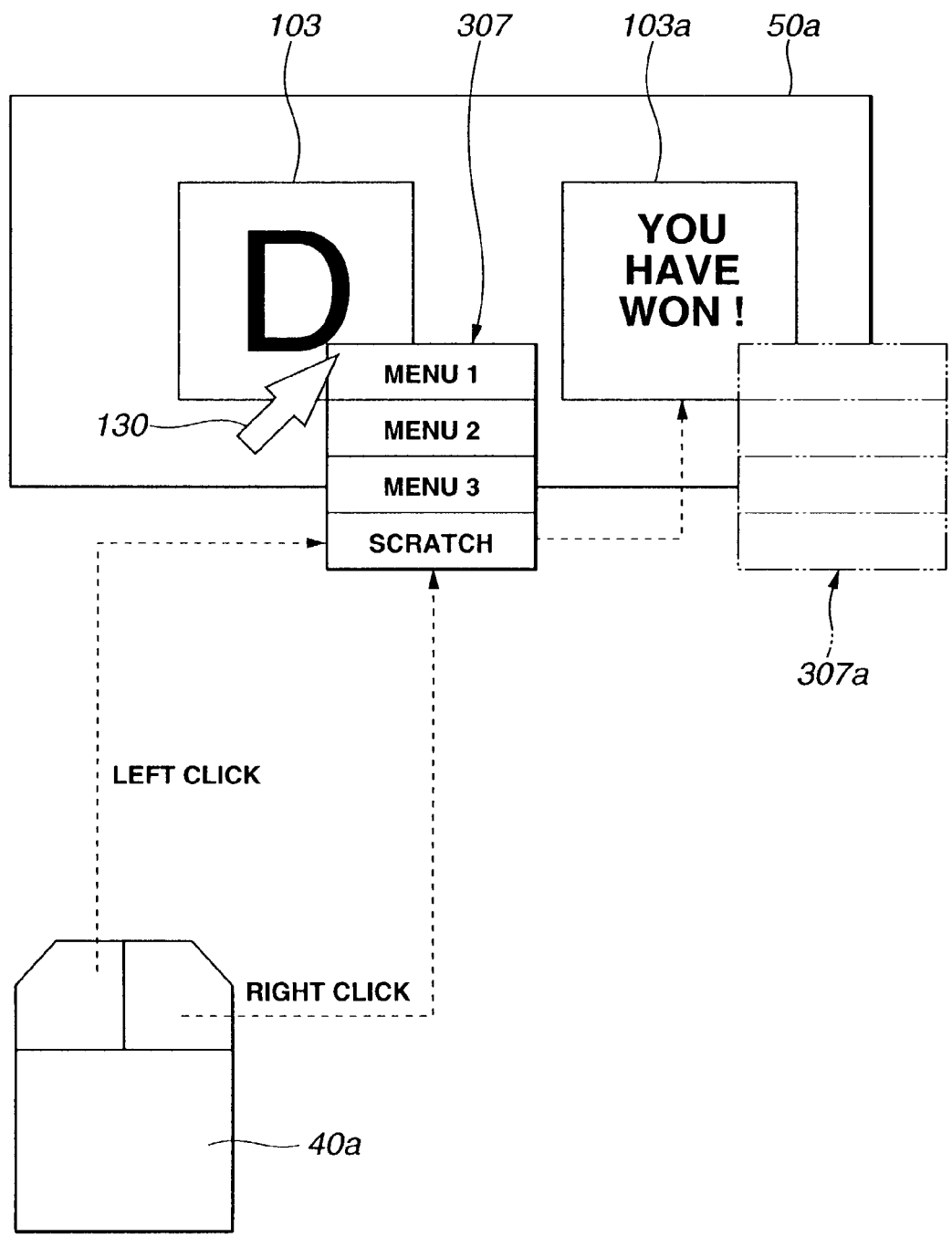
FIG. 6 is a diagram explaining the method of mouse operation in the second management region illustrated in FIG. 5.

To display the information 307 related to the icon 103 selected and displayed in the second management region 50*a*, the user needs only to move the pointer 130 to the icon 103 by moving the mouse 40*a* and then make a right click on the mouse 40*a*, as illustrated in FIG. 6. (The information 407 related to the secondary icon or any lower-order icon, 103*a*, may be displayed in similar way as will be described later.) The related information 307 is displayed when the image-display control means 72 (FIG. 2) detects the right click made on the mouse. Upon detecting the right click, the means 72 reads the information 307 from the related-information storing means 62, controls the display interface 30 and supplies the information 307 to the display. The related information 307 is thereby displayed.

In this embodiment, the related information 307 is displayed in the form of a menu as is illustrated in FIG. 6. The menu of the related information 307 is not limited to the one illustrated in FIG. 6. Rather, a more detailed menu may be displayed to help the user request for secondary related information. In this embodiment, the menu necessarily includes a scratch menu that informs the results of a prize contest or a lottery.

The scratch menu shows a win or a loss of the prize contest or a lottery that the icon 103 selected from the icons 100 to 104 for a prize contest or a lottery, displayed in the first management region 12*a* (FIG. 5).

The icon 103 representing prize contest or the lottery may include only the scratch menu as related information. Alternatively, the icon 103 may include not only the scratch menu but also other related information. This is the menu for use in acquiring the detailed information about the prize (or service) offered in the content or lottery represented by the icon 103.

The user may move the pointer 130 (FIG. 6) and may then make a left click on the mouse 40*a*, thus selecting the menu (for example, menu 1) that helps the user request for the secondary related information that is more detailed information. If this is the case, the related-information detecting/identifying means 66 (FIG. 2) operates the related-information requesting means 68 for requesting the detailed related information.

The related-information requesting means 68 controls the communications interface 20, either directly or via the data-communication control means 12. The secondary related information is thereby obtained via the network 6 (FIG. 1) from the secondary-data providing means 4*b* incorporated in the data-providing server 4B that is either identical or not identical to the data-providing server 4A. The secondary related information, i.e., detailed related information, is stored into the related-information storing means 62. The secondary related information thus stored is displayed in the related information 307, in the vicinity of the associated menu, when the user makes a right click on the mouse 40*a* shown in FIG. 6.

The secondary related information, i.e., the detailed information, represents the contents of the menu selected in the primary related information 307 if the menu that corresponds to the icon 103 is a list of the prizes offered in the prize contest or lottery. The explanation of the list is recorded, as the secondary related information, in the related-information storing means 62 illustrated in FIG. 2. The explanation is then displayed on the screen in the same manner as described above. To obtain the third-order or lower-order related information, which represents a specific menu included in the secondary related information, it suffices to perform the same operations as effected to acquire the secondary related information.

If the user selects a scratch menu included in the related information 307 that is of a lower order than the primary or secondary related information (that is, if he or she makes a left click on the mouse 40*a*), the icon-requesting means 58 (FIG. 2) is activated to request for other icons.

When activated, the icon-requesting means 58 obtains an icon 103*a* (a secondary icon) from the means 4*c*1 for providing other icons incorporated in the data-providing server 4C (FIG. 1), in the same way as the means 68 acquires an icon. The icon 103*a* (FIG. 5) thus obtained by the icon-requesting means 58 represents the outcome of the prize contest or the lottery. The icon 103*a* has been selected in the data-providing server 4C shown in FIG. 1, based on the condition of the data transmitted from the client terminal 2 and the condition of the data stored in the data-providing server 4C. In this embodiment, the result icon 103*a* functions as a result-display icon, as well. The icon 103*a* directly shows the outcome (a win or a loss) of the prize contest or lottery.

It is desired that the icon 103*a* thus obtained should contain related information 307*a*, just like the primary icon 103. If so, the user can read other related information from the related information 307*a* or can select, form a menu, a desirable method of delivering the prize if he or her wins in the contest or lottery.

Like the icon 103, the icon 103*a* is supplied via the related-information extracting means 60, icon-image storing means 64, image display control means 72 and display interface 30, all shown in FIG. 2. The icon 103*a* is therefore displayed in the second management region 50*a* (FIG. 6).

In the present embodiment, the icon 103*a* may replace the icon 103 in the second management region 50*a*. Alternatively, the icon 103*a* may be displayed along with the icon 103 in the region 50*a*.

The user of the client terminal 2 can get the information about the outcome in the prize content or the outcome in the lottery, seeing the icon 103*a* (i.e., result-displaying icon) that is based on the primary icon 103 and displayed in the second management region 50*a*. The user can understand, at a glance, the outcome of the prize contest or lottery. The information 307*a* related to the icon 103*a*, also displayed, shows the procedure the user must take if he or she wins in the prize contest or lottery.

SECOND EMBODIMENT

A data communications system according to the second embodiment of the invention will be described. This system is designed to help people to reserve concert tickets or the like. The system is similar in configuration to the system shown in FIGS. 1 and 2. The components different from some components of the system of FIGS. 1 and 2 will be described, and the other components identical to the other components shown in FIGS. 1 and 2 will not be explained.

Figure 7:
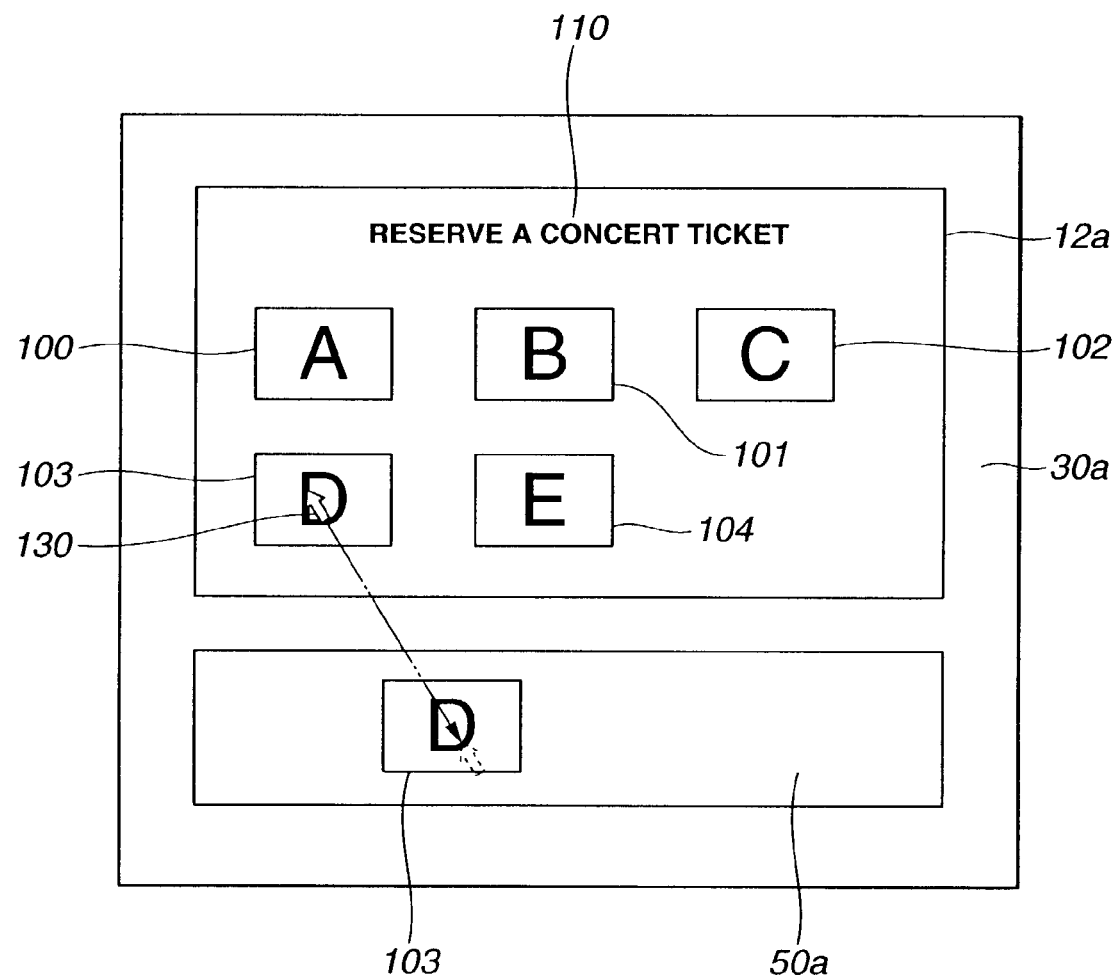
FIG. 7 is a diagram depicting another example of information displayed on the screen of a client terminal.

As FIG. 7 shows, a menu for reserving concert tickets is displayed in the first management region 12*a* on the screen 30*a*. The menu consists of character data and five icons 100 to 104. The character data shows that the menu is one for reserving concert tickets. The icons 100 to 104 are primary icons that represent five different concert tickets, respectively. The user may choose one of the icons 100 to 104 to reserve one ticket he or she wants. Assume the user drags the icon 103 and drops it in the second management region 50*a*, thereby selecting the concert ticket represented by the icon 103.

Figure 8:
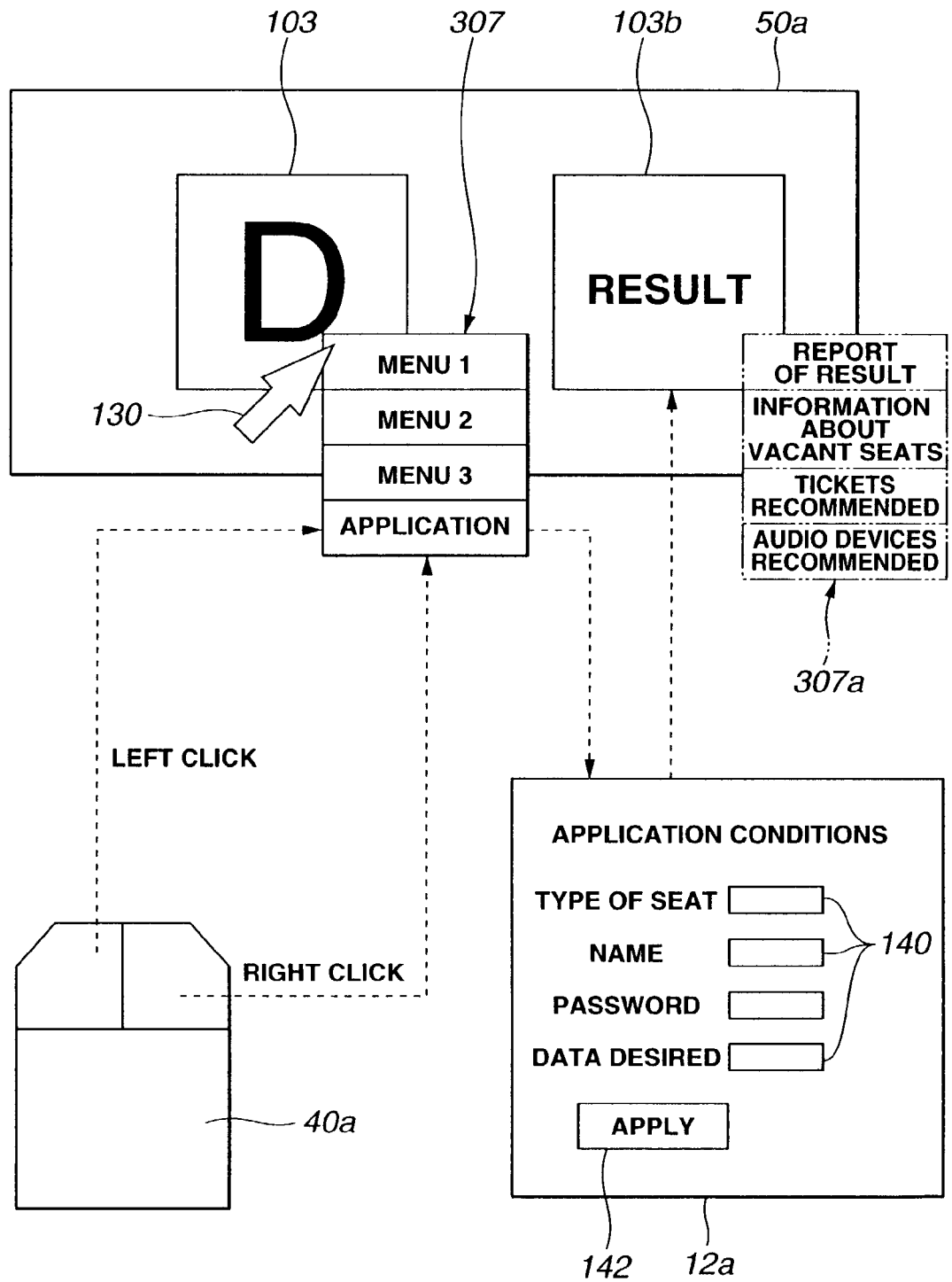
FIG. 8 is a diagram explaining the method of mouse operation in the second management region illustrated in FIG. 7.

Then, the related information 307 is extracted from the icon 103 that represents the ticket selected, as shown in FIG. 8 in the same way as in the first embodiment. The related information 307 is displayed in the form of a menu, at a position near the icon 103. The menu represented by the related information 307 contains a menu of applying for ticket reservation.

The reservation-applying menu is selected when the user operates the mouse 40*a*, moving the pointer 130 to the menu, and then clicks the mouse 40*a*. The icon-requesting means 58 (FIG. 2) is therefore activated, controlling the communications interface 20, either directly or via the data-communication control means 12. The user therefore has access to the data-providing server 4C through the network 6.

The means 4*c*2 for inputting an application-condition column receives the access signal and transmits the data representing an application condition sheet, to the data-communication control means 12. The control means 12 controls the display interface 30, whereby the application condition sheet is displayed in the first management region 12*a*, as is illustrated in FIG. 8. Input boxes 140 and an application button 142 are displayed on the application condition sheet. In the input boxes 140, there will be input the desired class of a seat, the name of the applicant, the password of the applicant, and the desired date for the concert.

After inputting the data items into the input boxes 140, the user moves the mouse 40*a*, moving the pointer 130 to the application button 142 and then making a left click on the mouse 40*a*. Then, the client terminal 2 has access to the data-providing server 4C through the network 6. In the data-providing server 4C, the data-storing means 4*c*3 for storing the data representing the application conditions input from the client terminal 2. From the data stored in the means 4*c*3, the result-operating means 4*c*4 whether the application conditions are acceptable or not. The data-providing server 4C transmits the icon 103*b* showing the decision made, to the client terminal 2. The icon 103*b* contains related information 307*a*, in the same way as in the first embodiment. As in the first embodiment, the icon 103*b* and the related information 307*a* are supplied via the icon-requesting means 58, related-information extracting means 60, related-information storing means 62, icon-image storing means 64, image display control means and display interface 30, all shown in FIG. 2. The icon 103*b* and the related information 307*a* are therefore displayed in the second management region 50*a* shown in FIG. 8.

In the present embodiment, the icon 103*b* (i.e., result-obtaining icon) shown in FIG. 8 does not indicates the result of reservation as the result-displaying icon 103*a* in the first embodiment. It displays an image relating to the result of reservation. The result of reservation is obtained by displaying the related information 307*a* extracted from the result-obtaining icon 103*b*, in the same way as other icons are displayed.

Character data that shows whether the reservation is accepted or not may be displayed as one data item included in the related information 307*a* displayed in the form of, for example, a menu. Alternatively, the result-informing menu may be displayed as one data item included in the related information 307*a*. In either case, the icon-requesting means 58 shown in FIG. 2 may be is activated to obtain the icon showing the result of the reservation, in addition to the result-obtaining icon 103b, and may then be displayed in the second management region 50a.

If the reservation is accepted, the result-obtaining icon 103b or the information related to the result-displaying icon, which is obtained from the icon 103b, should better contain the information about the procedure that must be taken after the reservation is accepted. This will make it easy for the user to take the subsequent procedure. If the reservation is not accepted, the result-obtaining icon 103b or the information related to the result-displaying icon, which is obtained from the icon 103b, may contain a menu showing the vacant seats of other classes, a menu representing the tickets of other concerts, a menu introducing the products of the sponsor company, or the like. The user may select any one of these menus to get other icons or detailed information related thereto. Seeing the menu he or she has selected, the user may be stimulated to reserve a ticket for a seat of another class or a ticket of another concert or of buying the products thus advertised.

The present invention is not limited to the embodiments described above. Rather, various changes and modifications can be made within the scope and spirit of the invention.

The embodiments described above are systems in which the client terminals 2 and 3 are personal computers. According to the invention, however, these terminals may be replaced with PDAs or digital TV sets. In this case, too, the configuration of FIG. 2 can be provided, thus reducing the invention to practice. If this is the case, input devices other than the mouse can be utilized.

The related information of the third order or any lower order may be of a small amount. If so, this related information may be contained in the icon 103 supplied from the primary-data providing means 4a by the method illustrated in FIG. 3 or FIG. 4. In this case, no request for the related information needs to be made to the data-providing server 4B shown in FIG. 1 every time the related information is required, and the related-information requesting means 68 no longer need to operate.

The primary icon 103 may contain a secondary icon (result-obtaining icon and/or result-displaying icon) as related information, provided that the amount of data does not exceed a predetermined limit. If this is the case, the secondary icon can be displayed in the second management region, without accessing the data-providing server 4C or the like from the icon-requesting means 58 shown in FIG. 2.

The system according to the present invention need not comprise all components shown in FIG. 2. The system may comprise only the components shown in FIG. 2, which are equivalent to the elements of any claim set forth hereinafter.

THIRD EMBODIMENT

Figure 9:
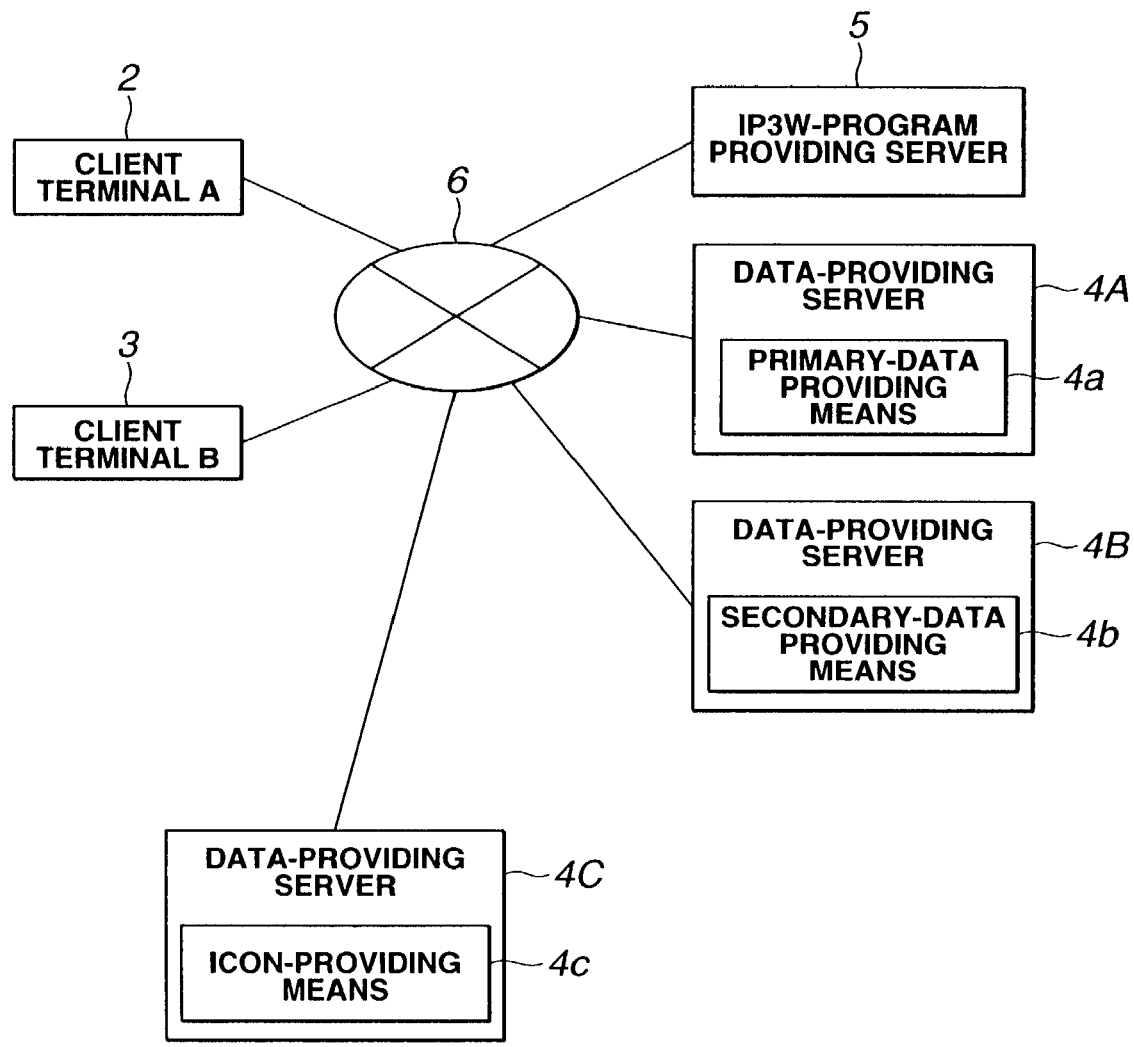
FIG. 9 is a diagram showing the overall structure of a system according to the third embodiment of the invention.

As FIG. 9 shows, the system according to the present embodiment has a plurality of client terminals 2 and 3 and a plurality of data-providing servers 4A, 4B, 4C and 5. Data communication can be accomplished among the terminals and the servers through a network 6. In the invention, the communications means for the network 6 is not limited to a specific one. The telephone lines, dedicated lines, radio waves or optical communication, or any possible combination of these. Nonetheless, the network 6 is of the Internet in the present embodiment.

The client terminals 2 and 3 are not limited to a particular type. They may be digital TV sets, PDAs, or the like. In this embodiment, they will be described as personal computers.

The client terminals 2 and 3 are identical in structure. Only the client terminal 2 will therefore be described below; the client terminal 3 will not.

The servers 4A, 4B 4C and 5 are, for example, general-purpose computers. Each of the computers comprises at least a CPU or a MPU, memories, a data storage device, a communications interface, a display device, and input devices. The memories are, for example, a RAM and a ROM. The data storage device may be a hard disc drive. The communications interface may be a modem or a terminal adapter. The display devices are, for example, a CRT or a LCD. The input devices are, for instance, a mouse and a keyboard.

The storage device and/or memories incorporated in each client terminal, i.e., a personal computer, store at least an operating system (OS) and some programs including HTTP browser software (e.g., Web browser or the like) and mail-transmitting/receiving software. Hence, the client terminal can transmit and receive information through the network 6. The storage device and/or memories provided in each server store at least an operating system (OS) and some programs including HTTP server software, so that the server may provide and transmit content information through the network 6.

In the present embodiment, the data-providing server 4A provides mainly the information about the first management region of the present invention. The data-providing server 5 provides chiefly the second information about the second management region program (hereinafter also called to as "IP3W program"). The data-providing server 4B receives the primary data from the data-providing server 4A and outputs the secondary data, or the detailed information related to the primary data. If the primary data contains data items introducing companies, the secondary data represents more detailed information about the companies. The data-providing server 4C provides other icons.

In the present invention, the servers 4A, 4B, 4C and 5 may be of different types or of the same type. It may be generally considered that the server 5 differs from the other servers 4A, 4B and 4C. However, the serves 4A, 4B and 4C may be identical to the server 5. Particularly, the server 4B and 4C can be identical to the server 5.

Figure 13:
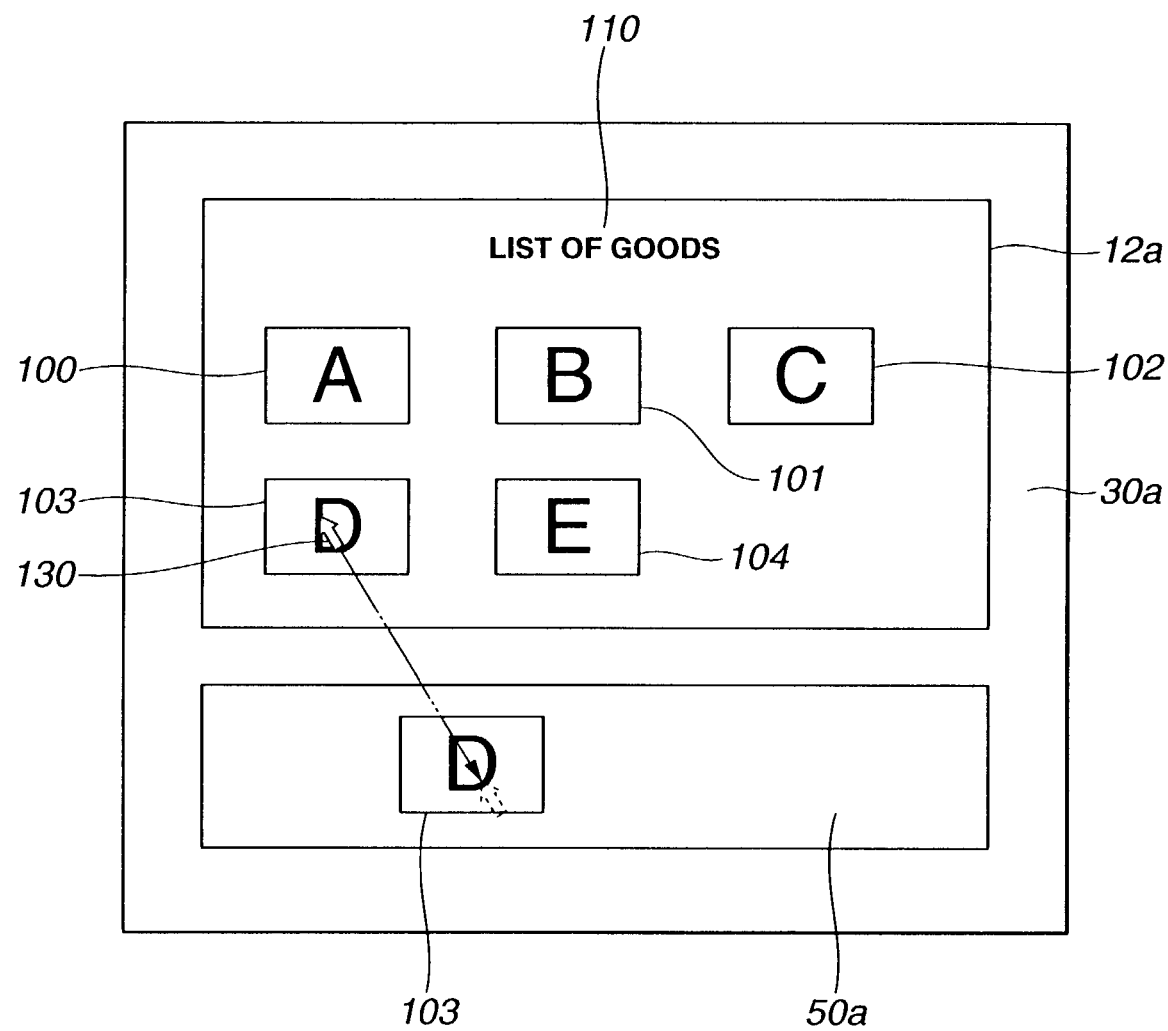
FIG. 13 a diagram depicting an example of information displayed on the screen of a client terminal.

Of the data-providing servers 4A, 4B and 4C incorporated in the present embodiment, the data-providing server 4A has a primary-data providing means 4a as is illustrated in FIG. 9. The data-providing server 4B has a secondary-data providing means 4b. The data-providing server 4C comprises a means 4c for providing other icons. The primary-data providing means 4a is designed to provide such content information as is displayed in the first management region 12a on the screen 30a of a client terminal, as is illustrated in FIG. 13. In this embodiment, the content information supplied from the primary-data providing means 4a incorporated in the data-providing server 4A contains at least one of primary icons 100 to 104 and character data 110 as is shown in FIG. 13.

The primary icons 100 to 104 help the user to understand, at a glance, what information the data-providing server 4A can supply. The secondary icons and the lower-order icons, which will be later described, serve the same purpose. The information shown in FIG. 13 includes five icons 100 to 104 (A to E) represent five new-model cars. These icons may be replaced by any other types of icons (for example, characters or signs) that represent game software items, types of personal computers, various kinds of tickets (including movie tickets).

In the present embodiment, the primary icons 100 to 104 contains related information each, like the secondary icons and lower-order icons that will be later described. The related information is not displayed, however, in the first management region 12a illustrated in FIG. 13. Of the image data, only the icons are displayed in the first management region 12a.

The method of embedding the related information in the image data is not limited to particular ones. Nonetheless, the following method may be employed to embed the related information into the image data.

Figure 11:
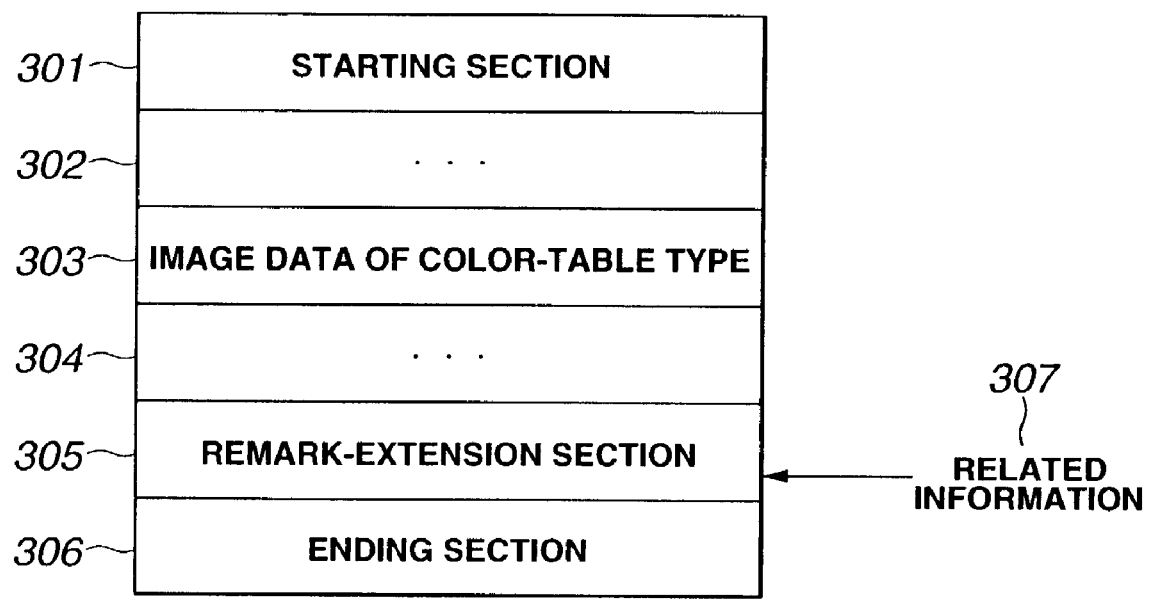
FIG. 11 is a schematic representation of an example of the process of embedding related information into image data.

FIG. 11 shows a format of the image data in which the related information embedded.

The image data is of, for example, GIF format. This does not mean that the format is limited to GIF format. Rather, the image data may be of JPG format or PCX format.

As is shown in FIG. 11, the starting section 301 is a field that is provided to indicate that the information is image data of the GIF format. The row of characters, "GIF," and the version number thereof are allocated to the starting section 301.

The image data 303 of color-table type is image data representing pixels that are arranged from the left to the right, from the top to the bottom. If the image data is of the GIF format, it is encoded by LZW algorithm for variable-length codes.

The remark-extension section 305 contains character data that cannot be graphic information included in a GIF data steam. The character data may represent the contents of graphics and the producer thereof, the remarks thereon. Further, the character data may contain control data items and other data items excluding graphic data items.

The ending section 306 is a field provided to indicate that the data stream has come to its end. Namely, the section 306 indicates that no other parameter data or the like follows the data stream.

A section 302 is inserted between the starting section 301 and the image data 303 of color-table type. Another section 304 is inserted between the image data 303 and the remark-extension section 305. These items of information are, for example, the parameters that define a screen region of a display in which an image will be displayed. The parameters are data items required to define the screen region, such as the width, the height and the color-resolution, all pertaining to the screen region.

The related information 307 is set in the remark-extension section 305 after it is encrypted or not encrypted at all. The remark-extension section 305 and the related information 307 are combined, thus providing an item of image data.

The image data in the form of a data stream can therefore contain the related information.

What has been explained above is all based on the assumption that the data format is GIF format. Nonetheless, any other format can be applied so long as the related information is recorded in a region isolated from the region where image data is recorded.

How the related information is embedded in the image data will be described with reference to FIG. 12.

Figure 12:
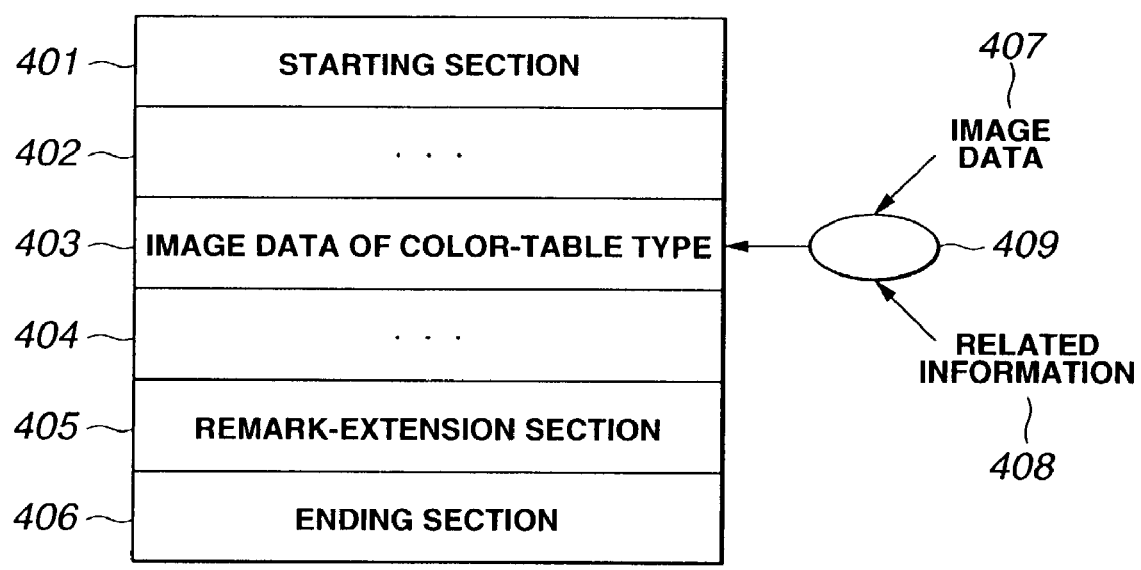
FIG. 12 is a schematic representation of another example of the process of embedding related information into image data.

FIG. 12 shows another format of image data in which the related information is embedded.

The format of FIG. 12 is GIF format, too. The format need not be GIF format, nevertheless. The image data may be of JPG format or PCX format.

The starting section 401 is a field that is provided to indicate that the information is image data of the GIF format. The row of characters, "GIF," and the version number thereof are allocated to the starting section 401.

The image data 403 of color-table that represents pixels that are arranged from the left to the right, from the top to the bottom. That is, the image data 403 is mixed data 409 that consists of image data 407 and related information 408. The related information is recorded in the form of a watermark and cannot be seen, while the image data remains visible. The mixed data 409 is encoded by LZW algorithm for variable-length codes.

The remark-extension section 405 contains the character data that cannot be graphic information included in a GIF data steam. The section 405 is a field that is not absolutely necessary in the format of FIG. 12. The user can use the section 405 if necessary, in whichever definition he or she gives to it.

The ending section 406 indicates the data stream has come to its end. In other words, this section 406 indicates that no other parameter data or the like follows the data stream. Note that the intermediate sections 402 and 404 of this data stream correspond to the sections 302 and 304 that are illustrated in FIG. 11.

The image data is of the GIF format as shown in FIG. 12. Nonetheless, any other format can be applied, provided that the related information items are recorded in regions isolated from the region where image data is recorded.

The related information is thus embedded in the icon image information. Content information that contains a plurality of image data items, each including the related information, may be transmitted to the client terminal 2 from the primary-data providing means 4a of the data-providing server 4A shown in FIG. 9. In practice, the client terminal 2 makes access to the content-providing server 4A through the network 6 and then acquires the content information from the first management region 12a illustrated in FIG. 13.

The terminal 2 has the commercially available browser that can cause to display the first management region 12a. Therefore, as shown in FIG. 13, a plurality of icons 100 to 104 are displayed in the first management region 12a on the screen 30a of the client terminal 2. In the present embodiment, the first management region 12a is a communications window that can be displayed by means of a browser such as the Internet Explorer. Ordinary browsers cannot cause displays to show the related information contained in the icons 100 to 104 shown in FIG. 13.

The data-providing server 5, the client terminals 2 and 3 and the icons 100 to 104 contain related information each. The related information can be displayed by executing IP3W program. To set tile IP3W program into any client terminal, the user of the client terminal may obtain a data-recording medium, such as a CD-ROM, which holds the IP3W program and may then install the program into the client terminal. Alternatively, the user may connect the client terminal to the data-providing server 5 (FIG. 9) through the network 6 and may then downloads the IP3W program. The data-providing server 5 may manage the information about the clients who wish to download the IP3W program into their own terminals.

The IP3W program is a program for displaying the second management region 50a (a region that can be called "IP3W"), as well as the first management region 12a that is a Web-browser window or the like. The IP3W program therefore serves to perform specific processes relating to the second management region 50a.

The computer provided in the client terminal into which IP3W program is downloaded or is installed from the data-recording medium such as a CD-ROM or which incorporates a dedicated logic circuit equivalent to the IP3W program will be described, with reference to mainly FIG. 10. The particulars of the IP3W program will be apparent from the following description. It may be understood that the IP3W program can be executed on the computer, no matter whichever OS, whichever other software, and whichever hardware are utilized.

Figure 10:
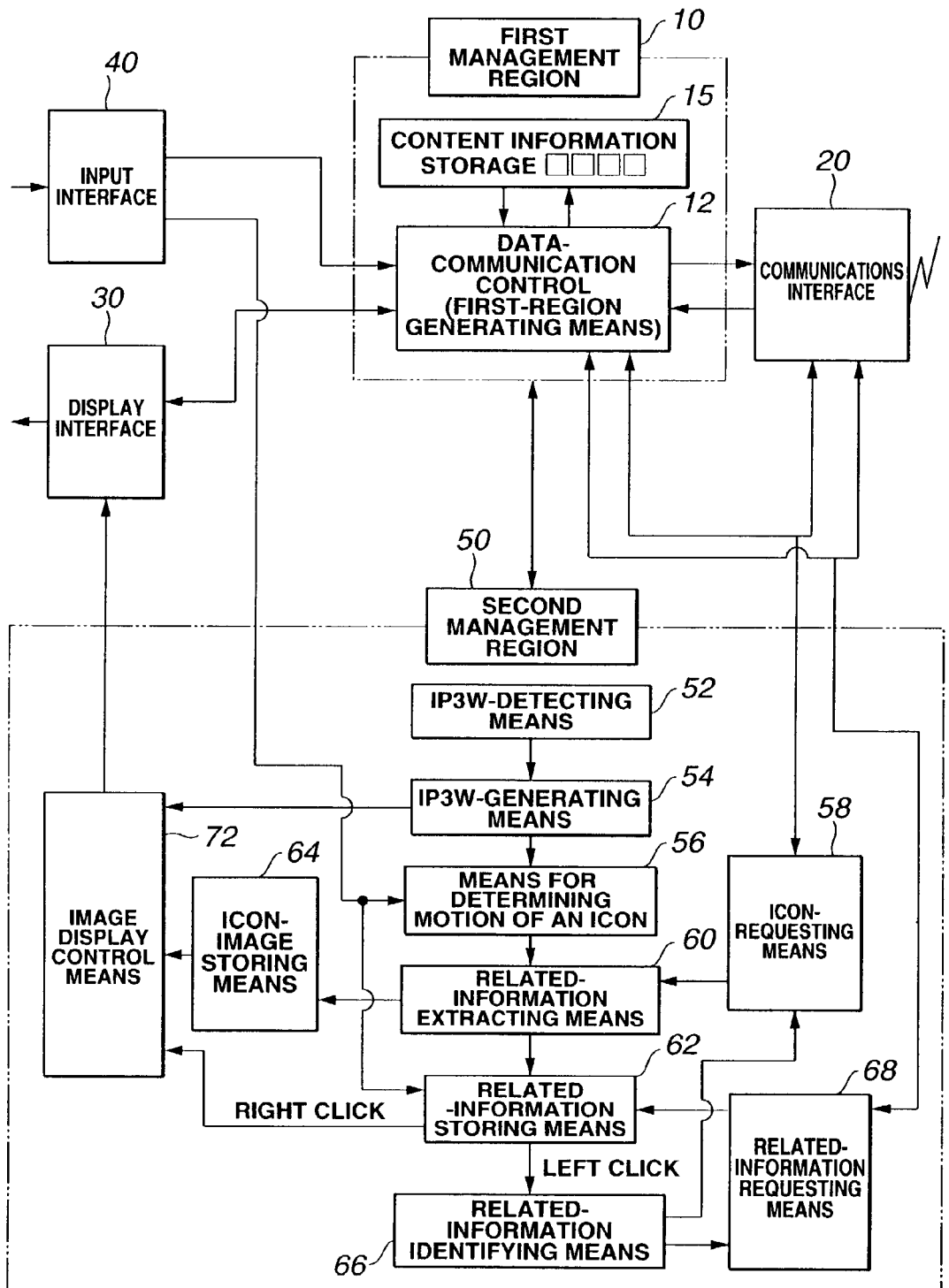
FIG. 10 is a block diagram illustrating the configuration of the third embodiment of the client terminal.

As FIG. 10 shows, the client terminal 2 has a first management-region control means 10, a second management-region control means 50, a communications interface 20, a display interface 30, and an input interface 40. The first management-region control means 10 and the second management-region control means 50 comprises a memory, a storage device and a processor, each. The memory and the storage device store various programs (including the OS). The processor is a CPU or a MPU that executes the programs.

The communications interface 20 is, for example, a modem or a terminal adapter. The interface 20 connects the first management-region control means 10 and/or the second management-region control means 50 to the network 6 illustrated in FIG. 9. If the terminal 2 is a PDA, the communications interface 20 may comprise an antenna or the like.

The display interface 30 is a connection device that connects the first management-region control means 10 and/or the second management-region control means 50, or both, to a display such as a CRT or an LCD. This connection device may be a contact type that connects electric wires or optical fibers. Alternatively, it may be a non-contact type that transmit and receive signals by using a medium such as electric waves, infrared rays or electromagnetic waves. FIG. 13 is a diagram depicting an example of information displayed on the screen of the display.

The input interface 40 is a connection device that connects the first management-region control means 10 and/or the second management-region control means 50 to input devices such as a mouse, a keyboard, a dial, a handle, a stick and a touch panel. This connection device may be a contact type that connects electric wires or optical fibers. Alternatively, it may be a non-contact type that transmit and receive signals by using electromagnetic waves such as electric waves or infrared rays.

The first management-region control means 10 has at least a data-communication control means 12 and a content information storage section 15. (The control means 12 includes a first management-region forming means of the present invention.) The data-communication control means 12 includes a memory or a storage device and a CPU or an MPU. The memory or the storage device stores the programs for accomplishing the Internet communication via the network 6 (FIG. 9). These programs are Internet Explorer or Netscape Navigator. The CPU or MPU executes the programs.

The content information storage section 15 is a section that can store the content information of which the data-communication control means 12 (e.g., Web browser) has acquired via the network 6 and the communications interface 20. The section 15 comprises a memory and/or a storage device, or both. In the present embodiment, the content information stored in the content information storage section 15 includes the above-mentioned icons 100 to 104.

One of the content information items stored in the content information storage section 15 may be displayed as content information in the first management region 12a, as is illustrated in FIG. 13. The content information shown in FIG. 13 has been transmitted via the network 6 from the data-providing server 4A shown in FIG. 9.

As specified in the detailed description of the IP3W program, the second management-region control means 50 shown in FIG. 10 may not be provided before the IP3W program is supplied to the client terminal 2. In this case, it suffices to install the IP3W program into the client terminal 2. The IP3W program can be installed in two alternative methods. In the first method, the program is installed from a removable data-recording medium such as a CD-ROM. In the second method, the program is downloaded from the data-providing server 5 (FIG. 9) that stores the IP3W program.

The IP3W program is downloaded via the network 6 from the data-providing server 5 illustrated in FIG. 9. The details of the IP3W program will be apparent from the block diagram of FIG. 10 and the following description. The following description is based on the assumption that the IP3W program has been installed into the computer incorporated in the client terminal 2.

The second management-region control means 50 has a storage device and/or a memory and a CPU and/or a MPU. The storage device and/or the memory can store the IP3W program or other information. The CPU and/or the MPU executes the IP3W program. In this embodiment, the second management-region control means 50 has an IP3W-detecting means 52 configured to detect the IP3W program.

The IP3W-detecting means 52 determines whether the storage device and/or memory of the computer stores the IP3W program or has a logic circuit equivalent to IP3W program. If the means 52 determines that the IP3W program has been installed into the computer, it informs the user of this fact. At the same time or at a different time, the means 54 (IP3W-generating means) for generating the second management region executes the IP3W program, displaying the second management region 50a on the screen 30a as is shown in FIG. 13. The means 52 may determine whether the IP3W program stored in the computer is of the latest version.

The IP3W-generating means 54, which is shown in FIG. 10, transmits a control signal to an image display control means 72 in order to display the second management region 50a (FIG. 13) on the screen 30a. The control signal is supplied via the display interface 30 and controls the process of displaying data on the screen 30a.

The detecting means 56, which is shown in FIG. 10, can determine whether a command has been input to move at least one of the icons 100 to 104 (FIG. 13) from the first management region 12a to the second management region 50a. More precisely, the means 56 determines whether or/not the user has operated the mouse, moving the pointer 130 on the screen 30a, dragging the icon 103 from the first management region 12a and to the second management region 50a and dropping the icon 103 in the second management region 50a.

If the command has been input to move the selected icon 103 from the first management region 12a to the second management region 50a, an icon identical to the icon 103 displayed in the first management region 12a is displayed in the second management region 50a.

Any icon 103 may be moved from the first management region 12a into the second management region 50a in the case where the user at the client terminal 2 wants to know, in detail, the information related to the icon 103 selected.

To understand the information related to the icon 103, in greater detail, by managing the first management region 12a only, it has been necessary for the user to read the long sentences contained in the content information (containing unnecessary items). It takes the user a long time to retrieve and obtain the very information he or she wants. Further, the user may push a button to jump to the home page of the contents associated with the icon 103 or may input the address of the home page. In this case, too, the user needs to read many sentences after accessing the home page, in order to retrieve the information he or she wish to obtain. It is troublesome for him or her to retrieve the very information he or she wants.

With this embodiment, it is very easy to retrieve the target information, merely by moving the icon 103 from the first management region 12a into the second management region 50a.

As FIG. 10 shows, the related-information extracting means 60 extracts the related information included in the icon 103 selected and displayed in the second management region 50a (FIG. 13) in accordance with the data supplied from the icon-motion detecting means 56. That is, the type of the data stream representing the target icon is analyzed, whereby the related information 307 of the type shown in FIG. 11 or the related information 408 of the type shown in FIG. 12 is extracted from the image data stream.

The related information extracted by the extraction means 60 is stored into the related-information storing means 62 illustrated in FIG. 10. The contents of this related information are displayed on the screen if they satisfy prescribed conditions. Meanwhile, the icon information detected by the icon-motion detecting means 56 is stored into the icon-image storing means 64 in accordance with the signal input from the icon-motion detecting means 56 or the related-information extracting means 60. The image-display control means 72 and the display interface 30 operate, displaying the icon represented by the image information stored in the means 64 in the second management region 50a of the screen 30a shown in FIG. 13.

Figure 14:
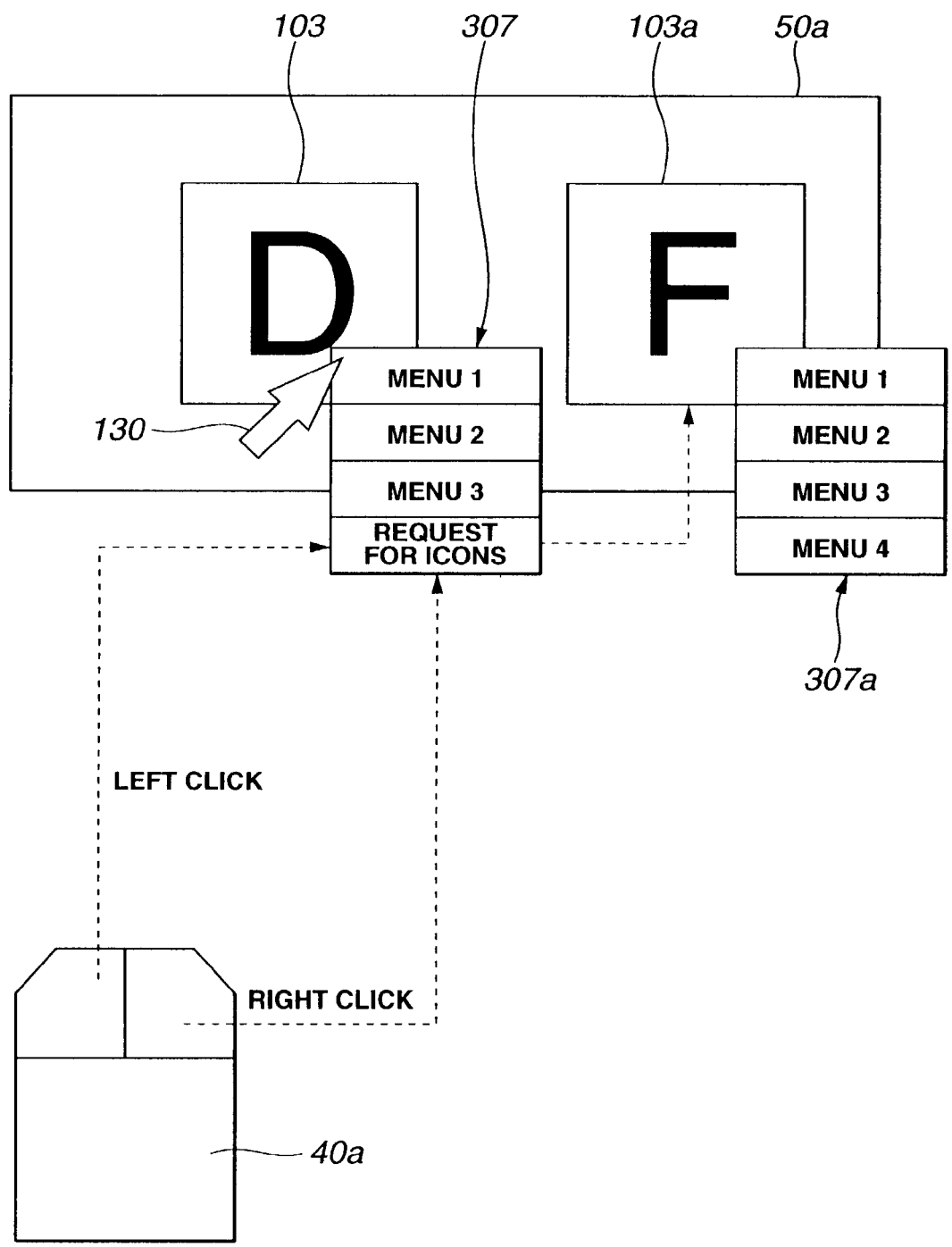
FIG. 14 is a diagram explaining the method of mouse operation in the second management region illustrated in FIG. 13.

To display the information 307 related to the icon 103 selected and displayed in the second management region 50a of the screen 30a, the user needs only to move the pointer 130 to the icon 103 by moving the mouse 40a and then make a right click on the mouse 40a, as illustrated in FIG. 14. (The information 407 related to the secondary icon or any lower-order icon, 103a, may be displayed in similar way as will be described later.) The related information 307 is displayed when the image-display control means 72 (FIG. 10) detects the right click made on the mouse. Upon detecting the right click, the means 72 reads the information 307 from the related-information storing means 62, controls the display interface and supplies the information 307 to the display. The related information 307 is thereby displayed.

In this embodiment, the related information 307 is displayed in the form of a menu as is illustrated in FIG. 14. The menu of the related information 307 is not limited to the one illustrated in FIG. 14. Rather, a more detailed menu may be displayed to help the user request for secondary related information. In this embodiment, the menu necessarily includes a menu for requesting other icons. This menu may include an item for requesting images of a car of new model (or a used car) viewed from various angles, an item for requesting magnified images thereof and an item for requesting the interior design of the car, if the primary icon 103 represents an perspective view of the car.

The user may move the pointer 130 (FIG. 14) and may then make a left click on the mouse 40a, thus selecting the menu (for example, menu 1) that helps the user request for the secondary related information that is more detailed information. If this is the case, the related-information detecting/identifying means 66 (FIG. 10) operates the related-information requesting means 68 for requesting the detailed related information.

The related-information requesting means 68 controls the communications interface 20, either directly or via the data-communication control means 12. The secondary related information is thereby obtained via the network 6 (FIG. 9) from the secondary-data providing means 4b incorporated in the data-providing server 4B that is either identical or not identical to the data-providing server 4A. The secondary related information, i.e., detailed related information, is stored into the related-information storing means 62. The secondary related information thus stored is displayed in the related information 307, in the vicinity of the associated menu, when the user makes a right click on the mouse 40a shown in FIG. 14.

The secondary related information, i.e., the detailed information, is not limited to a particular one. Nonetheless, it may be the explanation of "accessories to goods" if the menu selected in the primary related information 307 and corresponding to the icon 103 is a list of the accessories. The explanation of the list is recorded, as the secondary related information, in the related-information storing means 62 illustrated in FIG. 10. The explanation is then displayed on the screen in the same manner as described above. To obtain the third-order or lower-order related information, which represents a specific menu included in the secondary related information, it suffices to perform the same operations as effected to acquire the secondary related information.

The primary data supplied from the primary-data providing means 4a may represent the groups of goods of the same company. In this case, it is desired that the data-providing servers 4A and 4B should be one and the same. If the primary data supplied from the primary-data providing means 4a shows the groups of goods of the different companies, the servers 4A and 4B should be different ones, the server 4B provided for one company.

If the user selects a scratch menu included in the related information 307 (FIG. 14) that is of a lower order than the primary or secondary related information (that is, if he or she makes a left click on the mouse 40a), the icon-requesting means 58 (FIG. 10) is activated to request for other icons.

When activated, the icon-requesting means 58 obtains a secondary icon from the means 4c for providing other icons incorporated in the data-providing server 4C (FIG. 9), in the same way as the means 68 acquires an icon. The icon 103a thus obtained by the icon-requesting means 58 represents the images of the goods viewed from various angles. It is desired that the icon 103a should include the related information 307a, like the icon 103 that is the primary icon. Another related icon can be read from this related information 307a. Further, it is possible to select the price estimation of any good or the procedure of purchasing the good, by using the related information 307a.

Like the icon 103, the icon 103a is supplied via the related-information extracting means 60, icon-image storing means 64, image display control means 72 and display interface 30, all shown in FIG. 10. The icon 103a is therefore displayed in the second management region 50a illustrated in FIG. 14.

In the present embodiment, the icon 103a may replace the icon 103 in the second management region 50a. Alternatively, the icon 103a may be displayed along with the icon 103 in the region 50a.

The user of the client terminal 2 can get the information about the primary icon 103 as another icon, just seeing the icon 103a displayed in the second management region 50a. The user can understand, at a glance, the contents of the icon 103a. The icons 103 and 103a can be used for various purposes; they may be used as the background in the display screen of the computer, the background of mails, or the like.

The present invention is not limited to the embodiments described above. Rather, various changes and modifications can be made within the scope and spirit of the invention.

The embodiments described above are systems in which the client terminals 2 and 3 are personal computers as shown in FIG. 9. According to the invention, however, these terminals may be replaced with PDAs or digital TV sets. In this case, too, the configuration of FIG. 10 can be provided, thus reducing the invention to practice. If this is the case, input devices other than the mouse can be utilized.

The related information of the third order or any lower order may be of a small amount. If so, this related information can be contained in the icon 103 supplied from the primary-data providing means 4*a* by the method illustrated in FIG. 11 or FIG. 12. In this case, a request for the related information need not be made to the data-providing server 4B shown in FIG. 9 every time the related information is required, and the related-information requesting means 68 shown in FIG. 10 no longer need to operate.

The primary icon 103 may contain a secondary icon (result-obtaining icon and/or result-displaying icon) as related information, provided that the amount of data does not exceed a predetermined limit. If this is the case, the secondary icon can be displayed in the second management region, without accessing the data-providing server 4C or the like from the icon-requesting means 58 shown in FIG. 10.

The system according to the present invention need not comprise all components shown in FIG. 10. The system may comprise only the components shown in FIG. 10, which are equivalent to the elements of any claim set forth hereinafter.

As has been described, according to this invention there is provided a data-recording medium, a data-displaying apparatus, a data-providing apparatus and a data-providing system, each of which is useful in the course of exchanging information with other people through communications means such as telephone lines or dedicated lines, radio waves or optical communication. The data-recording medium, the data-displaying apparatus, the data-providing apparatus and data-providing system may be of the type that is user-friendly in, for example, applying an entry for a prize contest or a lottery or reservation by using a novel icon that makes it easy for the user to access data sources, retrieve data from the sources and file the data.

According to the present invention, there is provided a data-recording medium, a data-displaying apparatus, a data-providing apparatus and a data-providing system, each of which is useful in the course of exchanging information with other people through communications means, by using a novel icon which can be recognized at a glance and which makes it easy for the user to access data sources, retrieve data from the sources and file the data.

INDUSTRIAL APPLICABILITY

The present invention can provide a data-recording medium, a data-displaying apparatus, a data-providing apparatus and a data-providing system, each of which is useful in the course of exchanging information with other people through communications means. The data-recording medium, data-displaying apparatus, data-providing apparatus and data-providing system may be of the type that is user-friendly in, for example, applying an entry for a prize contest or a lottery or reservation by using a novel icon that makes it easy for the user to access data sources, retrieve data from the sources and file the data.

Moreover, this invention can provide a data-recording medium, a data-displaying apparatus, a data-providing apparatus and a data-providing system, each of which is useful in the course of exchanging information with other people through communications means, by using a novel icon which can be recognized at a glance and which makes it easy for the user to access data sources, retrieve data from the sources and file the data.

The invention claimed is:

1. A data-recording medium storing a second management-region program, the program, when executed by a computer, causing the computer to perform a method, the method comprising:

preparing a second management region on a display screen, in addition to a first management region;

receiving an icon-moving command to move a primary icon displaying an image from the first management region into the second management region, wherein the primary icon also displays the image after moving to the second management region;

extracting primary related information upon receiving the icon-moving command, the primary related information being embedded within the primary icon but not displayed in the first management region;

displaying the primary icon in the second management region in response to the received icon-moving command;

displaying the primary related information as a menu of primary related information items that is distinct from the primary icon;

displaying, in the secondary management region, a secondary icon that is related to the primary related information upon selection of at least one of the primary related information items;

accessing a data-providing server when at least one of the primary related information items or the secondary icon is selected;

acquiring, from the data-providing server, a result-obtaining icon; and displaying the result-obtaining icon in the second management region.

2. The data-recording medium according to claim 1, wherein at least one of related information items related to the primary icon, the secondary icon and lower-order icons is an application menu for applying an entry for a prize contest, a lottery or reservation.

3. The data-recording medium according to claim 2, wherein, when the application menu is selected, an application-condition column is displayed, in which conditions of application will be input.

4. The data-recording medium according to claim 1, wherein the related information contains a result-reporting menu that reports a result of a prize contest, a lottery or reservation.

5. The data-recording medium according to claims 4, wherein the result-reporting menu is selected to display a result-displaying icon related to the result of a prize contest, a lottery or reservation, in the second management region.

6. The data-recording medium according to claims 5, wherein the result-displaying icon is replaced by the result-obtaining icon.

7. The data-recording medium according to claim 5, wherein the result-displaying icon and/or result-obtaining icon contains a menu for acquiring information concerning the prize contest, a lottery or reservation, when the result thereof turned out to be negative.

8. The data-recording medium according to claim 1, wherein the result-obtaining icon is the secondary icon or any lower-degree icon.

9. The data-recording medium according to claim 1, wherein image data for displaying the icon contains at least the primary related information.

10. A data-displaying apparatus comprising:

first management-region preparing means for preparing a first management region on a display screen;

second management-region preparing means for preparing a second management region on the display screen;

determining means for determining whether an icon-moving command is input to move a primary icon displaying an image from the first management region into the second management region, wherein the primary icon also displays the image after moving to the second management region;

information-extracting means for extracting primary related information when the icon-moving command is input, the primary related information being embedded within the primary icon but not displayed in the first management region;

icon-displaying means for displaying the primary icon in the second management region when the icon-moving command is made;

information-displaying means for displaying the primary related information as a menu of primary related information items that is distinct from the primary icon;

icon-requesting means for acquiring a secondary icon from a data-providing server and displaying the secondary icon in the second management region upon selection of at least one of the primary related information items; and means for accessing the data-providing server upon selection of at least one of the primary related information items or the secondary icon;

means for acquiring, from the data-providing server, a result-obtaining icon; and means for displaying the result-obtaining icon in the second management region.

11. The data-displaying apparatus according to claim 10, wherein at least one of related information items related to the primary icon, the secondary icon and lower-order icons is an application menu for applying an entry for a prize contest, a lottery or reservation.

12. The data-displaying apparatus according to claim 11, wherein, when the application menu is selected, an application-condition column is displayed, in which conditions of application will be input.

13. The data-displaying apparatus according to claim 10, wherein the related information contains a result-reporting menu that reports a result of a prize contest, a lottery or reservation.

14. The data-displaying apparatus according to claims 13, wherein the result-reporting menu is selected to display a result-displaying icon related to the result of a prize contest, a lottery or reservation, in the second management region.

15. The data-displaying apparatus according to claims 14, wherein the result-displaying icon is replaced by the result-obtaining icon.

16. The data-displaying apparatus according to claim 14, wherein the result-displaying icon and/or result-obtaining icon contains a menu for acquiring information concerning the prize contest, a lottery or reservation, when the result thereof turned out to be negative.

17. The data-displaying apparatus according to claim 10, wherein the result-obtaining icon is the secondary icon or any lower-degree icon.

18. The data-displaying apparatus according to claim 10, wherein image data for displaying the icon contains at least the primary related information.

19. A data-providing apparatus having a second management-region program, the program, when executed by a computer, causing the computer to perform a method comprising:

preparing a second management region on a display screen, in addition to a first management region;

receiving an icon-moving command to move a primary icon displaying an image from the first management region into the second management region, wherein the primary icon also displays the image after moving to the second management region;

extracting primary related information upon receiving the icon-moving command, the primary related information being embedded within the primary icon but not displayed in the first management region;

displaying the primary icon in the second management region in response to the received icon-moving command;

displaying the primary related information, when a prescribed condition is satisfied, as a menu of primary related information items that is distinct from the primary icon;

displaying, in the secondary management region, a secondary icon that is related to the primary related information upon selection of at least one of the primary related information items;

accessing a data-providing server when at least one of the primary related information items or the secondary icon is selected;

acquiring, from the data-providing server, a result-obtaining icon; and displaying the result-obtaining icon in the second management region.

20. The data-providing apparatus according to claim 19, wherein at least one of related information items related to the primary icon, the secondary icon and lower-order icons is an application menu for applying an entry for a prize contest, a lottery or reservation.

21. The data-providing apparatus according to claim 19, wherein the prescribed condition is that a client terminal supplies a request signal to the apparatus.

22. A data-providing system comprising:

primary data supplying means for supplying a primary icon with embedded primary related information, to a terminal client;

application-condition supplying means for transmitting user information to the client terminal upon selection of an application menu at the client terminal, the application menu contained in the primary related information and distinct from the primary icon, wherein the primary related information is read from one of:
the primary icon;
a secondary icon read from the primary icon; and
a lower-order icon information read from the primary icon, wherein the secondary related information and lower-order related information are read from the primary related information;

condition-storing means for storing the user information at the client terminal;

result-operating means for calculating a result of the prize contest, the lottery or the reservation using the stored user information; and icon-supplying means for transmitting to the client terminal a result-obtaining icon that corresponds to the result calculated by the result-operating means.

23. A data-recording medium storing a second management-region program which, when executed by a computer, causes the computer to perform a method comprising:

preparing a second management region on a display screen, in addition to a first management region;

receiving an icon-moving command to move a primary icon displaying an image from the first management region into the second management region, wherein the primary icon also displays the image after moving to the second management region;

extracting primary related information upon receiving the icon-moving command, the primary related information being embedded within the primary icon but not displayed in the first management region;

displaying the primary icon in the second management region in response to the received icon-moving command;

displaying the primary related information as a menu that is distinct from the primary icon; and displaying, in the secondary management region, a secondary icon that is related to the primary icon upon selection of the menu of primary related information.

24. The data-recording medium according to claim 23, wherein the secondary icon is acquired from a data providing server via a communications means when the primary related information or at least one of secondary and lower-order related information items read from the primary related information is selected.

25. The data-recording medium according to claim 23, wherein image information for displaying the icon contains at least the primary related information.

26. The data-recording medium according to claim 24, wherein the primary icon displayed in the second management region is replaced by the secondary icon.

27. A data-displaying apparatus comprising:

first management-region preparing means for preparing a first management region on a display screen;

second management-region preparing means for preparing a second management region on the display screen;

determining means for determining whether an icon-moving command is input to move a primary icon displaying an image from the first management region into the second management region, wherein the primary icon also displays the image after moving to the second management region;

information-extracting means for extracting primary related information when the icon-moving command is input, the primary related information being embedded within the primary icon but not displayed in the first management region;

icon-displaying means for displaying the primary icon in the second management region when the icon-moving command is made;

information-displaying means for displaying the primary related information as a menu that is distinct from the primary icon; and means for displaying a secondary icon related to the primary icon, in the second management region, upon selection of the menu of primary related information.

28. The data-displaying apparatus according to claim 27, further comprising icon-requesting means for acquiring the secondary icon from a data-providing server via a communications means when the primary related information or at least one of secondary and lower-order related information items read from the primary related information is selected.

29. The data-displaying apparatus according to claim 27, wherein image information for displaying the icon contains at least the primary related information.

30. The data-displaying apparatus according to claim 27, wherein the primary icon displayed in the second management region is replaced by the secondary icon.

31. A data-providing apparatus having a second management-region program, the program, when executed by a computer, causing the computer to perform a method, the method comprising:

preparing a second management region on a display screen, in addition to a first management region;

receiving an icon-moving command to move a primary icon displaying an image from the first management region into the second management region, wherein the primary icon also displays the image after moving to the second management region;

extracting primary related information upon receiving the icon-moving command, the primary related information being embedded within the primary icon but not displayed in the first management region;

displaying the primary icon in the second management region in response to the icon-moving command;

displaying the primary related information as a menu that is distinct from the primary icon, when a prescribed condition is satisfied; and displaying a secondary icon related to the primary icon, in the secondary management region, upon selection of the menu of the primary related information.

32. The data-providing apparatus according to claim 31, wherein the prescribed condition is that a client terminal supplies a request signal to the apparatus via the communications means.

* * * * *